US012647862B2

(12) United States Patent
Roy et al.

(10) Patent No.: US 12,647,862 B2
(45) Date of Patent: Jun. 2, 2026

(54) SYSTEM AND METHOD FOR CONNECTION MANAGEMENT

(71) Applicant: Samsung Electronics Co., Ltd., Suwon-si (KR)

(72) Inventors: Koustav Roy, Bangalore (IN); Krishnamurthy Doddaballapur Ramu, Bangalore (IN); Mayank Mittal, Bangalore (IN); Ankur Pooniya, Bangalore (IN); Brijendra Kumar Asthana, Bangalore (IN); Arijit Sen, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 353 days.

(21) Appl. No.: 18/365,061

(22) Filed: Aug. 3, 2023

(65) Prior Publication Data

US 2023/0388881 A1    Nov. 30, 2023

Related U.S. Application Data

(63) Continuation of application No. PCT/KR2023/006384, filed on May 10, 2023.

(30) Foreign Application Priority Data

May 25, 2022    (IN) .............................. 202241030114
Mar. 28, 2023   (IN) .............................. 202241030114

(51) Int. Cl.
*H04W 36/08*     (2009.01)
*H04W 36/00*     (2009.01)
*H04W 76/10*     (2018.01)
(52) U.S. Cl.
CPC ....... *H04W 36/08* (2013.01); *H04W 36/0061* (2013.01); *H04W 76/10* (2018.02)

(58) Field of Classification Search
CPC . H04W 36/08; H04W 36/0061; H04W 76/10; H04W 48/02; H04W 48/16; H04W 48/18; H04W 88/06; H04W 36/0022
See application file for complete search history.

(56) References Cited

U.S. PATENT DOCUMENTS

2021/0051530 A1    2/2021  Venkataraman et al.
2023/0014944 A1*   1/2023  Chaponniere ......... H04W 36/00
(Continued)

FOREIGN PATENT DOCUMENTS

CN        111372327       7/2020
CN        114158033       3/2022
(Continued)

OTHER PUBLICATIONS

Indian Examination Report issued Apr. 26, 2024 in corresponding Indian Patent Application No. 202241030114.
(Continued)

*Primary Examiner* — Moo Jeong
*Assistant Examiner* — David Zhijun Sun
(74) *Attorney, Agent, or Firm* — NIXON & VANDERHYE P.C.

(57) ABSTRACT

The present disclosure relates to a system and a method for connection management. The method includes establishing, by a UE, a connection with a 5G cell. The established connection with the 5G cell is in a current tracking area of a 5G New Radio (NR). Further, the method includes determining, by the UE, one or more Long-Term Evolution (LTE) cells in the current tracking area or registration area that are not accessible to the UE (300). The one or more LTE cells are configured to operate on an LTE frequency. Furthermore, the method includes temporarily deprioritising or disabling, by the UE, a Stand Alone (SA) mode based on the deter-
(Continued)

mination of the one or more LTE cells in the current tracking area or the registration area that are not accessible to the UE.

14 Claims, 21 Drawing Sheets

(56)    References Cited

U.S. PATENT DOCUMENTS

| | | | | |
|---|---|---|---|---|
| 2023/0164642 A1 * | 5/2023 | Zhao | | H04W 36/302 |
| | | | | 370/331 |
| 2023/0239952 A1 * | 7/2023 | Shi | | H04W 36/00226 |
| | | | | 370/329 |
| 2023/0388886 A1 * | 11/2023 | Huang | | H04W 36/0088 |
| 2024/0284316 A1 * | 8/2024 | Li | | H04W 36/00222 |

FOREIGN PATENT DOCUMENTS

| | | | | |
|---|---|---|---|---|
| EP | 4185067 A1 * | 5/2023 | ............ | H04W 76/16 |
| WO | WO-2022014868 A1 * | 1/2022 | ............ | H04W 24/10 |
| WO | 2022/039452 | 2/2022 | | |
| WO | 2022/048375 | 3/2022 | | |
| WO | WO-2022048375 A1 * | 3/2022 | .......... | H04W 36/142 |
| WO | 2022/098475 | 5/2022 | | |

OTHER PUBLICATIONS

3GPP TSG-CT WG1, "Analysis of solutions for IMS voice availability", Meeting Notes, Meeting #131-e, Aug. 19-27, 2021, 4 pages.

3GPP TSG RAN WG5, "Proposing a new WI for inter-system mobility test cases between untrusted Non-3GPP and 3GPP system", Meeting Notes, Meeting #95-e, May 9-20, 2022, 7 pages.

3GPP TSG-CT WG1, "RPLMN for disabling S1 mode", Meeting Notes, Meeting #134-e, Feb. 17-25, 2022, 4 pages.

3GPP TSG-CT "Analysis of solutions for IMS voice availability", Meeting Notes, Meeting #131, Aug. 19-27, 2021, 4 pages.

3GPP TSG-RAN, "Proposing a new WI for inter-system mobility test cases between untrusted Non-3GPP and 3GPP system", Meeting Notes, Meeting #95, May 9-20, 2022, 6 pages.

3GPP TSG-CT, "RPLMN for disabling S1 mode", Meeting Notes, Meeting #134, Feb. 17-25, 2022, 4 pages.

3GPP TSG-RAN, "Applicability for 5G SA UE not supporting VoiceoverNR", Meeting Notes, Meeting #93, Nov. 8-19, 2021, 2 pages.

Search Report and Written Opinion dated Aug. 23, 2023 issued in International Patent Application No. PCT/KR2023/006384.

3GPP TSG-RAN5 Meeting #91-e, Electronic Meeting, R5-212425, May 17-28, 2021, 14 pages.

3rd Generation Partnership Project; Technical Specification Group Core Network and Terminals; Non-Access-Stratum (NAS) protocol for 5G System (5GS), 3GPP TR 24.501, Mar. 2023, 142 pages., V18.2.1.

3rd Generation Partnership Project; Technical Specification Group Core Network and Terminals; Non-Access-Stratum (NAS) protocol for Evolved Packet System (EPS), 3GPP TR 24.301, Mar. 2023, 112 pages, V18.2.1.

3rd Generation Partnership Project; Technical Specification Group Radio Access Network; Evolved Universal Terrestrial Radio Access (E-UTRA); User Equipment (UE) procedures in idle mode, 3GPP TS 36.304, Mar. 2023, 66 pages., V17.4.0.

3rd Generation Partnership Project; Technical Specification Group Radio Access Network; Evolved Universal Terrestrial Radio Access (E-UTRA); Radio Resource Control (RRC); Protocol specification, 3GPP TR 36.331, Mar. 2023, 308 pages, V17.4.0.

3rd Generation Partnership Project; Technical Specification Group Radio Access Network; NR; Radio Resource Control (RRC) protocol specification, 3GPP TS 38.331, Mar. 2023, 414 pages, V17.4.0.

3rd Generation Partnership Project; Technical Specification Group Radio Access Network; NR; User Equipment (UE) procedures in Idle mode and RRC, 3GPP TS 38.304, Mar. 2023, 51 pages, V17.4.0.

3rd Generation Partnership Project; Technical Specification Group Services and System Aspects; Procedures for the 5G System (5GS), 3GPP TS 23.502, Apr. 2023, 389 pages, V18.1.1.

3rd Generation Partnership Project; Technical Specification Group Services and System Aspects; System architecture for the 5G System (5GS), 3GPP TR 23.501, Mar. 2023, 361 pages., V18.1.0.

Indian Second Office Action dated Dec. 15, 2025 issued in Indian Patent Application No. 202241030114, 2 pp.

* cited by examiner

400B

500A

700

702

UE supports NR/LTE/WCDM/GSM

704

UE registered on
SA and detects that LTE is blocked
UE dials a silent call

Call success

706

UE stays on NR as VoNR is possible

Call failure

708

UE leaves NR and start searching another RAT/PLMN which can provide voice connectivity.

1100B

1200

Establish a connection with a 5G cell by a UE ~ 1202

Determine one or more LTE cells in the current tracking or registration area that are not accessible to the UE ~ 1204

Temporarily deprioritize or disable an SA mode based on the determination of the one or more LTE cells ~ 1206

1300

Establish a connection by a UE with a 4G cell — 1302

Determine one or more SA cells in the current tracking area or registration area that are not accessible to the UE — 1304

Temporarily deprioritize or disable the SA mode supporting the one or more SA cells based on the determination of one or more SA cells — 1306

SYSTEM AND METHOD FOR CONNECTION MANAGEMENT

CROSS-REFERENCE TO RELATED APPLICATIONS

This application is a continuation of International Application No. PCT/KR2023/006384 designating the United States, filed on May 10, 2023, in the Korean Intellectual Property Receiving Office and claiming priority to Indian Provisional Patent Application No. 202241030114, filed on May 25, 2022, in the Indian Patent Office, and to Indian Complete Application No. 202241030114, filed on Mar. 28, 2023, in the Indian Patent Office, the disclosures of all of which are incorporated by reference herein in their entireties.

FIELD

Background

The disclosure relates to wireless communication. For example, the disclosure relates to a system and method for connection management.

Description of Related Art

Generally, one or more cells, such as Long-Term Evolution (LTE) cells and New Radio (NR) cells are temporarily disabled by a User Equipment (UE) based on one or more scenarios to avoid the one or more cells for accessing one or more services. For example, a cell in a particular Radio Access Technology (RAT) may be disabled for multiple reasons, such as EPS Mobility Management (EMM) cause during attach or Tracking Area Update (TAU) or registration reject, congestion, broadcasted information (e.g., System Information Blocks (SIB s), UE implementation specific disabling (e.g., security mode failure), and the like. Further, in accordance with a scenario, the one or more cells in a tracking area are temporarily disabled due to one or more EMM or 5G Mobility Management (5GMM) rejects, as illustrated in Table 1.

TABLE 1

| | |
|---|---|
| #12 (Tracking area not allowed); | Forbidden tracking areas for regional provision of service |
| #13 (Roaming not allowed in this tracking area); | Forbidden tracking areas for roaming |
| #15 (No suitable cells in tracking area); | Forbidden tracking areas for roaming |

Further, in accordance with another scenario, information associated with the one or more cells are received in SIBs as intra-frequency and inter-frequency forbidden cell list respectively. For example, the information associated with the one or more cells received in SIBs 4 and 5 as are illustrated in Table 2.

TABLE 2

| |
|---|
| intraFreqForbiddenCellList |
| List of disabled intra-frequency neighbouring cells. |
| interFreqForbiddenCellList |
| List of disabled inter-frequency neighbouring cells. |

Furthermore, in accordance with another scenario, the one or more cells are temporarily disabled based on one or more conditions, such as SIB failure, security mode command failures, integrity protection failures, and the like.

Conventionally, 5G Core (5GC) does not have access to information associated with the one or more cells disabled in Evolved Packet Core (EPC). Similarly, EPC does not have access to information associated with the one or more cells disabled in 5GC. Thus, there is no mechanism to exchange the information associated with the one or more cells for a particular UE between inter-core networks which results in call drops. For example, if a 5G cell supports calling feature based on Evolved Packet System Fall Back (EPS FB) method, it is not possible for 5GC to know if one or more LTE cells are temporarily disabled in a tracking area before redirecting UE to a particular LTE cell or frequency. This may result in call drops.

Currently, the 5GC may support calling feature via Voice over New Radio (VoNR) and EPS FB. In the VoNR, a voice call may complete over New Radio (NR). Further, in the EPS FB, the voice call may initiate over LTE once 5GC redirects the UE to an LTE frequency. However, there are multiple scenarios associated with the 5GC supporting the calling feature via the VoNR and the EPS FB which may result in call drop or data stall issues. In accordance with a scenario, when the UE initiates a voice call or a video call over the 5GC or receives a Mobile Terminated (MT) call while in the 5GC and the 5GC supports calling over the EPS FB in a tracking area, and one or more LTE cells are disabled due to previous reject causes or some other reason, then the EPS FB may fail as the UE cannot reselect to any disabled cell.

FIG. 1 is a sequence diagram 100 illustrating a call drop in standalone (SA) while one or more LTE cells are disabled, as per an existing technique. When one or more preconditions are satisfied, such as UE supports SA, the network supports voice over the EPS PB or UE supports EPS FB only, the one or more LTE cells are disabled by the UE at the tracking area e.g. due to maximum number of registration failure while UE was on LTE or UE received Tracking area not allowed cause while performing attach over network and the UE is connected over a 5G SA cell and initiated a voice call, the 5G SA cell initiates EPS PB to the one or more LTE cells. The UE cannot camp on the one or more LTE cells or send Tracking Area Update (TAU) request if the one or more LTE cells are disabled by the UE resulting in call failure. In some cases, the one or more LTE cells may get disabled for a long duration, such as 12 hours or more in case EMM reject cause came as 15 (no suitable tracking area in the region). In these cases, the severity of the issue may be huge as all calls may drop for 12 or more hours. Thus, when the one or more LTE cells get disabled, all calls fail until LTE cells in the tracking area or for that PLMN gets allowed for UE e.g. UE may block LTE cells for 12 or more hours. Now referring to FIG. 1, at 102, the UE sends an attach request or the TAU request, such as TAI 1 Tracking Area Id 1 (TAI 1), to the EPC. Further, at 104, the EPC rejects attach with EMM cause #15 e.g., tracking area not allowed. At 106, the UE reselects to the 5G SA. At 108, the UE gets registered with 5G SA network. At 110, the UE initiates the voice call. Furthermore, at 112, the UE sends an invite request to 5G SA network. At 114, the 5GC redirects the UE to the LTE frequency which belongs to a cell in tracking area e.g., TAI 1. The UE cannot send the TAU or attach request to TAI 1 as it has received tracking area not allowed (e.g., EMM cause #15) before resulting in call drop.

In accordance with another scenario, if one or more NR cells in the 5GC are disabled and the network redirects the UE to the one or more 5GC cells while in the LTE due to higher priority RAT, then the UE may not be in service as the UE cannot reselect a disabled 5G cell. In this case, the UE may stay in no service until it triggers full band scan and moves to a suitable cell for cell reselection. Further, the UE is in no service as the UE is being redirected to a disabled 5GC Cell from LTE RAT for a minute. Thus, the issue of no service may keep getting extended resulting in drainage of the UE's battery for repeated full band scans.

FIG. 2 is a sequence diagram illustrating a UE stuck in band scanning in SA, as per an existing technique. When one or more preconditions are satisfied, such as UE supports SA, one or more NR cells at that registration area are disabled by the UE, the UE camped on an LTE cell in that region and the UE is attached over the LTE cell, the network redirects the UE to a disabled SA cell. The UE detects an SA cell in a redirected frequency, but the UE cannot send a registration request as the SA cell is disabled. Further, the UE performs a full band scan but cannot detect any available cell. Furthermore, the full band scan may take a lot of time e.g., up to minutes. Thus, the UE may be in no service and any Mobile Originated (MO) or MT call may also fail during this time. When the UE comes back to LTE after the full band scan in SA, the network redirects the UE to 5G SA resulting in no service for 1 minute or more. This redirection by the network or the EPC to the 5G SA may continue again once UE recovers back from no service to LTE and the UE is denied service for a longer duration. Further, the full band scan results in the consumption of UE battery and power quickly due to tuning away for different bands. This similar issue of no service is seen during field testing in star-hub network in all QC chipset supporting devices. Now referring to FIG. 2, at 202, the UE sends a registration request to a 5G SA cell-1, such as TAI 1, to the EPC. Further, at 204, the 5GC rejects attach with EMM cause #15 e.g., tracking area not allowed. At 206, the UE reselects to the LTE. At 208, the UE gets attached with the EPC. At 210, the network redirects the UE to the 5G SA cell-1, such as TAI 1. Furthermore, at 212, the UE cannot camp on the 5G SA cell-1 or cannot send the registration request as 5G SA cell-1 is disabled by the UE. At 214, UE goes to no service and initiates the full band scan in 5G SA but cannot detect any cell. This process may take around 1 min. At 216, the UE camps back to the LTE and gets connected to the network. Thus, the UE remains in no service resulting in call failures.

Therefore, there is a need for a mechanism to overcome the call drop and data stall issues for UEs.

SUMMARY

According to an example embodiment of the present disclosure, a method implemented in a User Equipment (UE) for connection management is disclosed. The method includes establishing, by the UE, a connection with a 5G cell. The established connection with the 5G cell is in a current tracking area of a 5G New Radio (NR). Further, the method includes determining, by the UE, one or more Long-Term Evolution (LTE) cells in one of the current tracking area and registration area that are not accessible to the UE. The one or more LTE cells are configured to operate on an LTE frequency. Furthermore, the method includes temporarily deprioritising or disabling, by the UE, a Stand Alone (SA) mode based on the determination of the one or more LTE cells in one of the current tracking area and the registration area that are not accessible to the UE.

According to an example embodiment of the present disclosure, a method for reducing service loss in a Stand Alone (SA) mode of the UE is disclosed. The method includes receiving a slice priority by a UE from a network for each slice of one or more slices over a non-access stratum (NAS). Further, the method includes establishing, by a UE, a connection with a 4G cell. The established connection with the 4G cell is in a current tracking area of a 4G LTE. Furthermore, the method includes determining, by the UE, one or more SA cells in one of the current tracking area and registration area that are not accessible to the UE. The one or more SA cells are configured to operate on a NR frequency. The method also includes temporarily deprioritising or disabling, by the UE, the SA mode supporting the one or more SA cells based on the determination of one or more SA cells in one of the current tracking area and the registration area that are not accessible to the UE.

According to an example embodiment of the present disclosure, UE for connection management is disclosed. The UE comprises a memory and one or more processors communicatively coupled to the memory. Further, the one or more processors are configured to establish a connection with a 5G cell. The established connection with the 5G cell is in a current tracking area of a 5G NR. Furthermore, the one or more processors are configured to determine one or more LTE cells in one of the current tracking area and registration area that are not accessible to the UE. The one or more LTE cells are configured to operate on an LTE frequency. The one or more processors are configured to temporarily deprioritize or disable a SA mode based on the determination of the one or more LTE cells in one of the current tracking area and the registration area that are not accessible to the UE.

According to an example embodiment of the present disclosure, a UE configured to reduce service loss in a SA mode of the UE is disclosed. The UE comprises a memory and one or more processors communicatively coupled to the memory. Further, the one or more processors are configured to establish a connection with a 4G cell. The established connection with the 4G cell is in a current tracking area of a 4G LTE. Furthermore, the one or more processors are configured to determine one or more SA cells in one of the current tracking area and registration area that are not accessible to the UE. The one or more SA cells are configured to operate on a NR frequency. Additionally, the one or more processors are configured to temporarily disable or deprioritize the SA mode supporting the one or more SA cells based on the determination of one or more SA cells in one of the current tracking area and the registration area that are not accessible to the UE.

To further clarify the advantages and features of the present disclosure, a more detailed description will be rendered with reference to various example embodiments thereof, which are illustrated in the appended drawings. It is appreciated that these drawings depict example embodiments and are therefore not to be considered limiting its scope.

BRIEF DESCRIPTION OF THE DRAWINGS

The above and other aspects, features and advantages of certain embodiments of the present disclosure will be more apparent from the following detailed description, taken in conjunction with the accompanying drawings in which like reference numbers refer to like parts elements, and in which.

Figure 1:
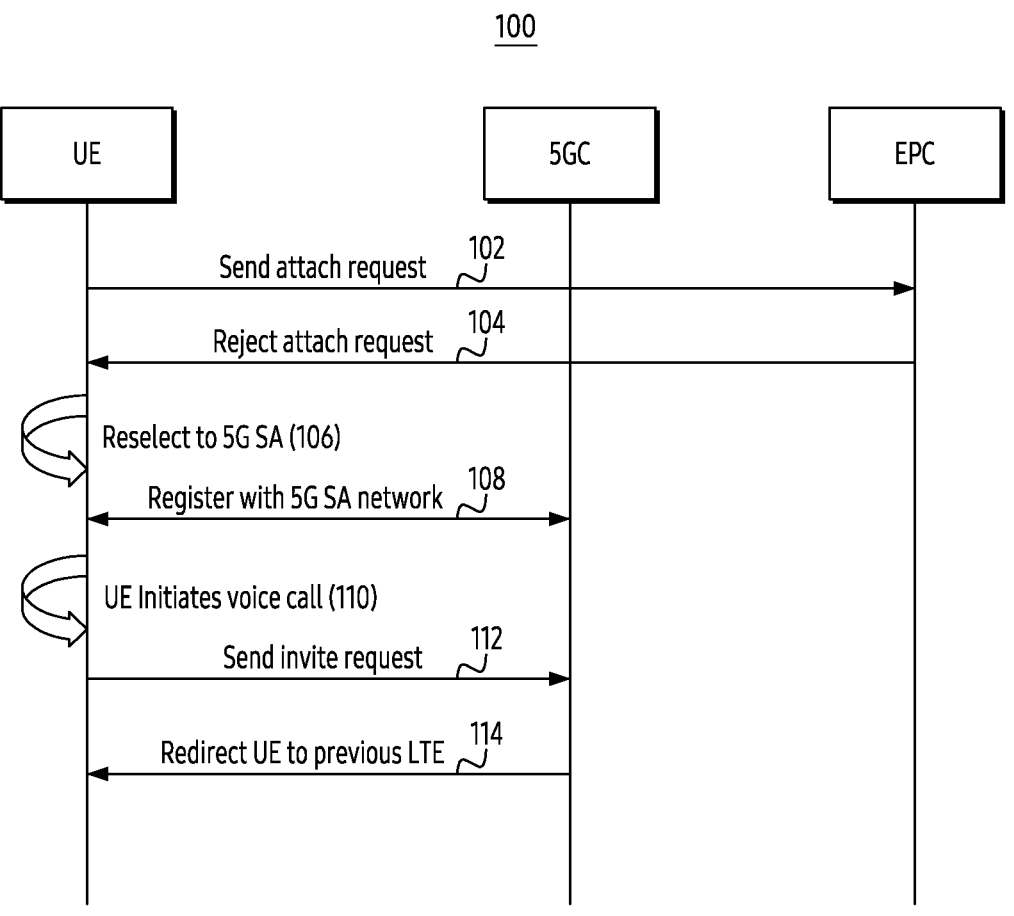
FIG. 1 is a sequence diagram illustrating a call drop in a standalone (SA) while one or more LTE cells are disabled, as per an existing technique.
Figure 2:
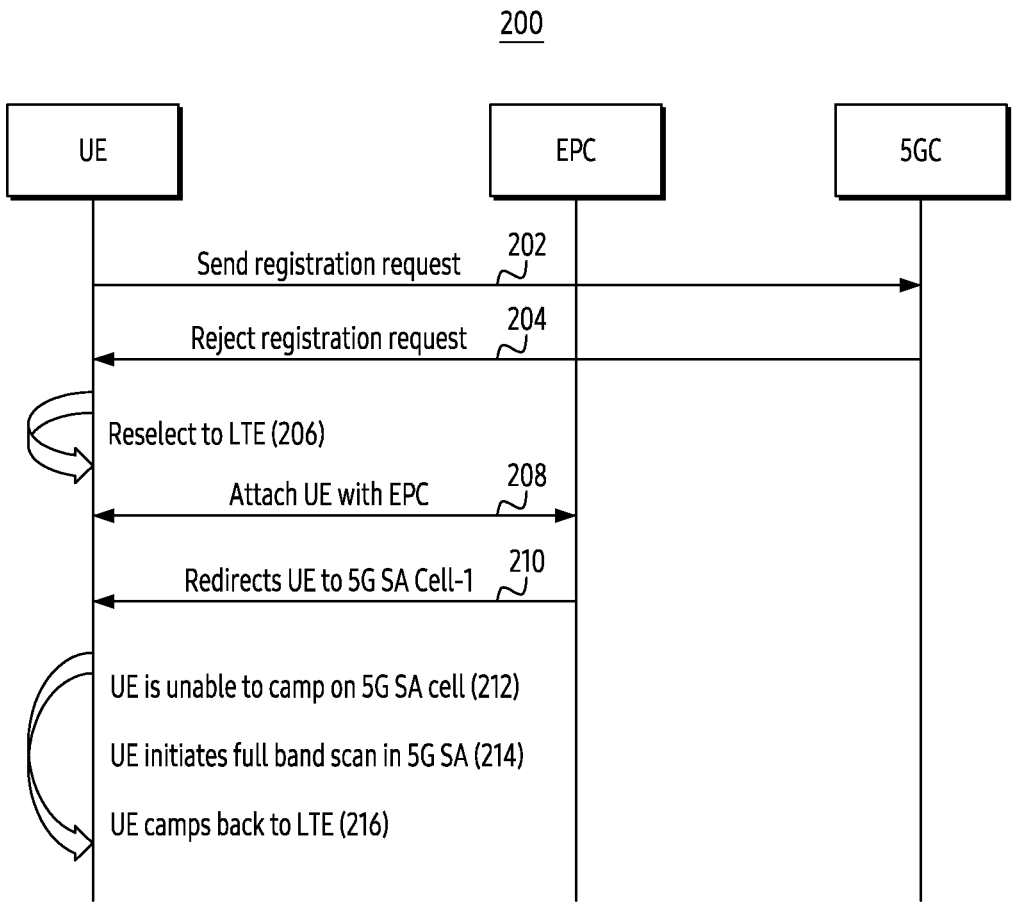
FIG. 2 is a sequence diagram illustrating a user equipment (UE) stuck in band scanning in the SA, as per an existing technique, according to an embodiment of the present disclosure.

Further, skilled artisans will appreciate that elements in the drawings are illustrated for simplicity and may not have necessarily been drawn to scale. For example, the flowcharts illustrate example operations to help to improve understanding of aspects of the present disclosure. Furthermore, in terms of the construction of the device, one or more components of the device may have been represented in the drawings by conventional symbols, and the drawings may show various specific details that are pertinent to understanding the various example embodiments of the present disclosure so as not to obscure the drawings with details that will be readily apparent to those of ordinary skill in the art having the benefit of the description herein.

DETAILED DESCRIPTION

It should be understood at the outset that although illustrative implementations of various example embodiments of the present disclosure are illustrated below, the present disclosure may be implemented using any number of techniques, whether currently known or in existence. The present disclosure should in no way be limited to the illustrative implementations, drawings, and techniques illustrated below, including the example design and implementation illustrated and described herein, but may be modified within the scope of the appended claims along with their full scope of equivalents.

The term "some" as used herein may include "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" may include "no embodiment, or one embodiment, or more than one embodiment, or all embodiments."

The terminology and structure employed herein is for describing, teaching, and illuminating various example embodiments and their features and elements and does not limit, restrict, or reduce the spirit and scope of the claims or their equivalents.

For example, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way, it may still be referred to as "one or more features" or "one or more elements" or "at least one feature" or "at least one element." Furthermore, the use of the terms "one or more" or "at least one" feature or element do not preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having ordinary skill in the art.

Embodiments of the present disclosure will be described below in greater detail with reference to the accompanying drawings.

Figure 3:
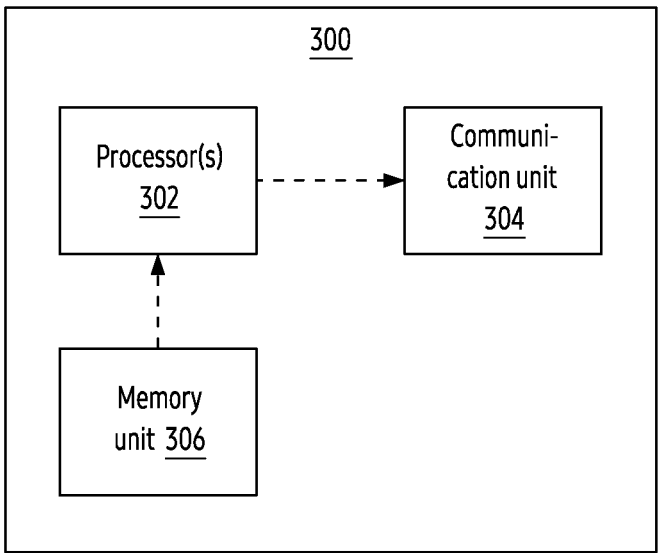
FIG. 3 is a diagram illustrating an example configuration of a User Equipment (UE) for connection management, according to various embodiments.

FIG. 3 is a block diagram illustrating an example configuration of a User Equipment 300 (UE) for connection management, according to an embodiment of the present disclosure. The configuration of FIG. 3 may be understood as a part of the configuration of the UE 300. Hereinafter, it is understood that terms including "unit" or "module" at the end may refer to the unit (e.g., including circuitry) for processing at least one function or operation and may be implemented in hardware, software, or a combination of hardware and software.

Referring to FIG. 3, the UE 300 may include one or more processors (e.g., including processing circuitry) 302, a communication unit (e.g., including communication circuitry) 304 (e.g., communicator or communication interface), and a memory unit (e.g., including a memory) 306 (e.g., storage). By way of example, the UE 300 may be a User Equipment, such as a cellular phone or other devices that communicate over a plurality of cellular networks (such as a 3G, 4G, a 5G or pre-5G, 6G network or any future wireless communication network). The communication unit 304 may perform functions for transmitting and receiving signals via a wireless channel As an example, the one or more processors 302 may include a single processing unit or a number of units, all of which could include multiple computing units including various processing circuitry. The one or more processors 302 may be implemented as one or more microprocessors, microcomputers, microcontrollers, digital signal processors, central processing units, state machines, logic circuitries, and/or any devices that manipulate signals based on operational instructions. Among other capabilities, the one or more processors 302 are configured to fetch and execute computer-readable instructions and data stored in the memory. The one or more processors 302 may include one or a plurality of processors. One or a plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors may control the processing of the input data in accordance with a predefined operating rule or artificial intelligence (AI) model stored in the non-volatile memory and the volatile memory, e.g., memory unit 306. The predefined operating rule or artificial intelligence model is provided through training or learning.

The memory unit 306 may include any non-transitory computer-readable medium including, for example, volatile memory, such as static Random-Access memory (SRAM) and dynamic random access memory (DRAM), and/or non-volatile memory, such as read-only memory (ROM), erasable programmable ROM, flash memories, hard disks, optical disks, and magnetic tapes.

Various embodiments disclosed herein may be implemented using processing circuitry. For example, various example embodiments disclosed herein may be implemented using at least one software program running on at least one hardware device and performing network management functions to control the elements.

In an embodiment of the present disclosure, the one or more processors 302 of the UE 300 may be configured for connection management. The UE 300 supports Stand Alone (SA) and camps on SA cell e.g., a 5G cell. The 5G cell also supports voice or video calls by Evolved Packet System Fallback (EPS PB). The one or more processors 302 are configured to establish a connection with the 5G cell. In an embodiment of the present disclosure, the established connection with the 5G cell is in a current tracking area of a 5G New Radio (NR). The one or more processors 302 are configured to detect, after establishing the connection with the 5G cell, that the UE 300 is redirected by the 5G NR from the 5G cell to one or more Long-Term Evolution (LTE) cells associated with an LTE frequency in the current tracking area. In an embodiment of the present disclosure, the one or more LTE cells are configured to operate on the LTE frequency. In detecting that the UE is redirected by the 5G NR from the 5G cell to the one or more LTE cells, the one or more processors 302 associates the 5G cell with the LTE frequency of the one or more LTE cells in an acquisition database upon the redirection of the UE 300 from the 5G cell to the one or more LTE cells.

Further, the one or more processors 302 may control the communication unit 304 to transmit an invitation request to the 5G NR based on the established connection. In an embodiment of the present disclosure, the invitation request indicates an initiation of an incoming call or an outgoing call.

Furthermore, the one or more processors 302 may determine the one or more LTE cells in the current tracking area or registration area that are not accessible to the UE 300. In determining the one or more LTE cells in the current tracking area and the registration area that are not accessible to the UE 300, the one or more processors 302 disables the 5G cell associated with the LTE frequency where the one or more LTE cells are not accessible. The temporary disablement of the 5G cell ensures that no further call may be dropped while the UE 300 is in a SA network. In an embodiment of the present disclosure, the 5G cell is added to an unallowed cell database by the UE 300. Further, the one or more processors 302 identifies an LTE cell associated with a new tracking area. In an embodiment of the present disclosure, the identified LTE cell is configured to operate on a new LTE frequency. Further, the unallowed cell database excludes a listing of the new LTE frequency and the identified LTE cell. In an embodiment of the present disclosure, the UE 300 may reselect to the identified LTE Cell operating on the new LTE frequency to continue with the call. The UE 300 may use a neighbour cell database for faster camping with the identified LTE cell. This information may be availed from an acquisition database if the 5G cell and the 4G cell mapping is available. In an embodiment of the present disclosure, the reselection to the identified LTE cell ensures that the current call does not get dropped as the UE 300 can connect with the network in the LTE. Furthermore, the one or more processors 302 remove the 5G cell from the unallowed cell database based on a predefined (e.g., specified) criterion in response to determining that the one or more LTE cells are removed from the unallowed cell database. In an example embodiment of the present disclosure, the predefined criterion may be removal of the or more LTE cells are from the unallowed cell database, a removal of a Universal Subscriber Identity Module (USIM), switching the UE 300 ON or OFF, and the like. The procedure of disabling the cell associated with the LTE frequency may help the UE 300 to overcome any further call drops as the call may never originate on disabled cells. In an embodiment of the present disclosure, the process to establish the call in the LTE may consume more time. Details on UE's 300 response to the determination of the one or more LTE cells inaccessible to the UE 300 are explained in greater detail below with reference to FIGS. 4A and 4B.

To describe embodiments, some terms may be defined. The term 'N1 mode' refers to a mode of a UE allowing access to the 5G core network via the 5G access network. The term 'S1 mode' refers to a mode applied to a system having functional separation according to the use of the S1 interface between the 4G access network and the 4G core network.

In an embodiment of the present disclosure, the unallowed cell database may store global cell IDs, association of two global cell IDs belonging to two different core networks, or a combination thereof which may not be used to access a service by UE 300. The unallowed cell database may also store a timing information e.g., a time until which global cell IDs are required to be stored in the unallowed cell database. When the time expires, the UE 300 may remove the global cell IDs and the associated global cell IDs from the unallowed cell database. Thus, all cells may become usable for normal services upon removal. For example, Table 3 and Table 4 represent schema for the unallowed cell database, such that table 3 is directed to table 4.

TABLE 3

```
Disabling_db: [{
"global_cell_id":"",
"plmn_id":"",
"tracking_area_id":"",
"associated_core_network":"",
"mapped_global_cell_ids": [ ],
"time_remains_to_be_in_disablelist":"",
},
{
...
}]
```

TABLE 4

```
mapped_global_cell_ids :[{
"global_cell_id":"",
"plmn_id":"",
"tracking_area_id":"",
"associated_core_network":"",
"time_remains_to_be_in_disablelist":"",
},
{
...
}]
```

In an embodiment of the present disclosure, the acquisition database may include the association of the global cell IDs of two or more cells belonging to different RATs. In an example embodiment of the present disclosure, the acquisition database may store the mapping between two RATs and their available frequency list which can be used in case redirected cell or frequency cannot be found by the UE 300. For example, Table 5 and Table 6 represent schema for the acquisition database, such that table 5 is directed to table 6.

TABLE 5

```
Acquisition_db:[{
"global_cell_id":"",
"plmn_id":"",
"tracking_area_id":"",
"associated_core_network":"",
"frequency_cell_belongs_to":"",
"mapped_global_cell_ids":[ ]
},
{
...
}]
```

TABLE 6

```
mapped_global_cell_ids :[{
"global_cell_id":"",
```

TABLE 6-continued

```
"plmn_id":"",
"tracking_area_id":"",
"associated_core_network":"",
"frequency_cell_belongs_to":"",
},
{
...
}]
```

Further, the one or more processors 302 determines if SA cells in a current registration area supports the Voice over New Radio (VoNR) or the EPS FB. The one or more processors 302 maintain a call database based on a result of the determination. The one or more processors 302 temporarily disables or deprioritize an SA mode based on the determination that all NR cells or currently camped SA cell supports the EPS PB in the current registration area associated with LTE tracking area and the determination of the one or more LTE cells in the current tracking area or the registration area that are not accessible to the UE 300. The disablement of the SA mode allows the UE 300 to overcome any call drops. In an embodiment of the present disclosure, the UE may change its RAT priority order and optionally make 5G SA as lowest RAT in RAT priority order for UE. This process requires to maintain the call database to store the VoNR and EPS FB support information. If the information stored in the call database is used and UE 300 disables NR SA support or lower RAT priority order for 5G SA RAT by default upon determining that the one or more LTE cells are disabled in that area, the UE 300 may not be able to use the VoNR or the NR SA or use NR SA as last resort even though the UE 300 may support the VoNR and the NR SA as UE identifies Network only supports the EPS FB or the UE itself is not supporting VoNR feature. Details on temporarily disabling the SA mode or changing the RAT priority order of 5G SA RAT will be explained in greater detail below with reference to FIGS. 5A, 5B and 5C. In an embodiment of the present disclosure, the SA mode is temporarily disabled or RAT priority for 5G SA has been modified for reducing a call drop until an occurrence of a change in the established connection from the current tracking area to a new tracking area, a completion of a predetermined amount of time after disabling the SA mode, removal of the one or more LTE cells from the unallowed cell database, or any combination thereof.

In an embodiment of the present disclosure, the call database may store voice call support procedure e.g., VoNR, EPS FB, Circuit Switch Fallback (CS FB), and the like for each cell. Table 7 represents a call database schema.

TABLE 7

```
Call_db:[{
"global_cell_id":"",
"plmn_id":"",
"tracking_area_id":"",
"associated_core_network":"",
"voice_call_support":[ ]
},
{
...
}]
```

In determining that the one or more LTE cells in the current tracking area are not accessible, the one or more processors 302 are configured to temporarily disable an S1 mode for reducing a call drop until an occurrence of a change in the established connection from the current tracking area to a new tracking area, a completion of a predetermined amount of time after disabling the S1 mode, a removal of the one or more LTE cells from the unallowed cell database, or any combination thereof. The temporarily disablement of the S1 mode allows the UE 300 to overcome any call drops. Further, the one or more processors 302 may cause the UE to transmit a registration request to the 5G NR. In an embodiment of the present disclosure, the registration request includes a message indicating that the S1 mode is not supported by the UE 300. This process may require network handling e.g., network taking proper decisions based on S1 mode support indication. Details on transmission of the registration request to the 5G NR will be described in greater detail below with reference to FIGS. 6A and 6B.

In an embodiment of the present disclosure, the UE 300 is unable to identify VoNR support at gNB side. In this scenario, it is possible that LTE system is disabled/blocked at the UE 300 side due to any kind of hard failure while the UE 300 may be attached to the LTE. Since, the UE 300 supports VoNR, the UE 300 camps on the NR. Further, the UE 300 is required to determine if the VoNR supports on gNB. This is not possible without initiating a voice call. The UE 300 determines the network VoNR status based on one or more conditions. In an example embodiment of the present disclosure, the one or more conditions are LTE mode e.g., the S1 mode does not support due to any failure/device feature, UE 300 supports VoNR and camped on NR SA network, and the like. In temporarily disabling the S1 mode, the one or more processors 302 are configured to dial a call over the 5G NR without user intervention. In an embodiment of the present disclosure, the call corresponds to a test call, or a silent call dialed without informing the user. For example, if the SA mode is disabled, the call may be initiated on LTE or lower RATs as per applicability. Further, the one or more processors 302 determines, based on the dialed call, whether the UE 300 is supported by the VoNR in the 5G NR in response to temporarily disabling the S1 mode. If the dialed call is successful, it is possible to support VoNR on the UE 300 and the UE 300 can stay on NR. The one or more processors 302 disconnect with the NR and search a new RAT/Public Land Mobile Network (PLMN) for initiating the incoming call or the outgoing call when it is determined that the call fails, and the UE 300 is unsupported by the VoNR. The new RAT/PLMN provides the voice connectivity. In an embodiment of the present disclosure, there will be no new timer for the NR and a current LTE backoff timer may run for the NR as well. the UE may also deprioritise NR RAT in this above mentioned scenario. After the current LTE backoff timer expires, both the LTE and the NR may be unblocked, and VoNR/Voice over LTE (VoLTE) services are restored on NR/LTE. Details on UE's 300 response to the determination that the UE 300 is supported by the VoNR will be described in greater detail below with reference to FIG. 7.

In an embodiment of the present disclosure, the LTE system is disabled/blocked at the UE 300 side due to any kind of hard failure while the UE 300 may be attached to the LTE. Since, the UE 300 supports VoNR, the UE 300 camps on the NR. The Communication Processor (CP)/modem indicates IP Multimedia Subsystem (IMS) informing LTE PLMN blocked. The UE 300 initiates a call over NR. When the UE 300 is supported by the VoNR and the S1 mode is temporarily disabled, the one or more processors 302 detects a failure in the initiation of the incoming call or the outgoing call in the 5G NR. After one or multiple retries and cause of failure, the IMS performs CS FB based on a determination that the LTE PLMN is blocked and EPSFB is not possible.

Further, the IMS sends permanent failure on SA to modem, such that the modem moves to an alternate RAT (CS RAT) to make sure that next MT call is success. Further, the one or more processors 302 permanently disables the SA mode in the 5G NR based on the detected failure. The one or more processors 302 of the UE 300 also switch to a 3G network from the 5G NR supporting the SA mode for initiating the incoming call or the outgoing call. In an embodiment of the present disclosure, there will be no new timer for the NR and the current LTE backoff timer may run for the NR as well. After the current LTE backoff timer expires, both the LTE and the NR may be unblocked, and VoNR/VoLTE services are restored on NR/LTE. Details on response of the UE 300 to the determination that the UE 300 is supported by the VoNR and the S1 mode is temporarily disabled will be described in greater detail below with reference to FIG. 8.

In detecting the failure in the initiation of one of the incoming call or the outgoing call in the 5G NR, the one or more processors 302 switches to an Evolved Packet Data Gateway (EPDG) network from the 5G NR. In an embodiment of the present disclosure, the switching to the EPDG network is performed over Wireless-Fidelity (Wi-Fi) by registering the UE 300 in the EPDG over Wi-Fi for initiating the incoming or the outgoing call. For example, If the Wi-Fi is available and the EPDG connection is possible over the Wi-Fi, move voice registration to the EPDG (Wi-Fi). Details on switching to the EPDG will be described in greater detail below with reference to FIG. 9. Further, the one or more processors 302 perform an EPDG registration over a cellular network when a UE 300 registration with the EPDG network is unsuccessful over the Wi-Fi. For example, if Wi-Fi is unavailable or EPDG connection is not possible over Wi-Fi, use cellular data as tunnel and perform EPDG registration over cellular network to move voice to EPDG. Further, the UE 300 wait for a PLMN block timer expiry. After the PLMN block timer expires, the UE 300 performs voice registration over the cellular network. Further, the process is repeated if it is not possible to enable the LTE.

In an embodiment of the present disclosure, the one or more processors 302 of the UE 300 reduces service loss in the SA mode of the UE 300. For reducing the service loss in the SA mode, the one or more processors 302 establishes a connection with a 4G cell. In an embodiment of the present disclosure, the established connection with the 4G cell is in a current tracking area of the 4G LTE. In an embodiment of the present disclosure, the one or more processors 302 detects, after establishing the connection with the 4G cell, that the UE 300 is redirected by the 4G LTE from the 4G cell to one or more SA cells associated with the NR frequency in the current tracking area. Further, the one or more processors 302 determines the one or more SA cells in the current tracking area or the registration area that are not accessible to the UE 300. In an embodiment of the present disclosure, the one or more SA cells are configured to operate on a NR frequency. The one or more processors 302 temporarily disables or deprioritize the SA mode supporting the one or more SA cells based on the determination of one or more SA cells in the current tracking area or the registration area that are not accessible to the UE 300. In an embodiment of the present disclosure, the SA mode is temporarily disabled or deprioritized for reducing the call drop until an occurrence of a change in the established connection from the current tracking area to a new tracking area, a completion of a predetermined amount of time after disabling the SA mode, a removal of the one or more SA cells from the unallowed cell database, or any combination thereof.

In a scenario, the UE 300 supports the SA and the SA is disabled for UE 300 in a current tracking area. Further, the LTE is redirecting the UE 300 to 5G SA. The one or more processors 302 disable N1 mode support or deprioritise NR RAT while sending attach or tracking area update request to the LTE. In an embodiment of the present disclosure, the N1 mode remains disabled or NR RAT may remain deprioritised until the UE 300 changes tracking area, location, the USIM is removed, the UE 300 switches off/on, or any combination thereof. The temporarily disablement of the N1 mode allows the UE 300 to overcome no service for around 1 minute. Details on temporarily disabling the N1 will be described in greater detail below with reference to FIGS. 10A and 10B.

In temporarily disabling or deprioritizing the SA mode, the one or more processors 302 sets a RAT selection priority to Universal Mobile Telecommunications System (UMTS) and Global System for Mobile communication (GSM). In an embodiment of the present disclosure, the RAT selection priority is order of scanning or prioritising each RAT type. For example, if the RAT selection priority is 5G>4G>3G>2G, the UE 300 may first attempt to acquire and scan 5G RAT followed by 4G RAT, followed by 3G RAT and lastly 2G RAT if no other RAT is present or providing required services. Further, the one or more processors 302 deprioritizes the SA mode to be lowest in a RAT selection table. In an embodiment of the present disclosure, the SA mode corresponds to an NR RAT. The RAT selection table includes the RAT selection priority.

Further, the 5G NR notifies to the 4G LTE that the 5G cell and the one or more SA cells are disabled and added to the unallowed cell database. In an example embodiment of the present disclosure, 5GC or EPC may exchange information associated with disabled cells or tracking area code in between them for each UE 300. Furthermore, the 4G LTE notifies to the 5G NR that the 4G cell and the one or more LTE cells are disabled and added to the unallowed cell database. In an example embodiment of the present disclosure, 5G RAT e.g., Next Generation (NG)—evolved NodeB (eNB) or 4G RAT e.g., eNB may exchange information associated with disabled cells or tracking area code in between them for each UE 300. The exchange of such information allows the network to stop unnecessary routing to the unallowed cell database or avoid any call drop. Further, the network is required to take disabled information of other RAT into account before redirecting the UE 300 to other RAT during a call.

Furthermore, the one or more processors 302 receives a new Information Element (IE) or an existing IE from a 5G SA network to indicate Voice over New Radio (VoNR) feature support at a Radio Access Network (RAN) level. In an embodiment of the present disclosure, the IE is associated with a dedicated message or a broadcasted message in a Radio Resource Control (RRC) or a MAC layer, such as UE 300 capability information, RRC Reconfiguration, MAC CE configuration, and the like. Further, the one or more processors 302 determines if the VoNR feature is supported at the RAN level based on the received new IE or the received existing IE. In an embodiment of the present disclosure, a presence of the new IE or the existing IE indicates a RAN level support for the VoNR feature or EPS PB support. In an embodiment of the present disclosure, an absence of the new IE or the existing IE indicates the EPS FB support at the RAN Level or VoNR support at the RAN Level. Further, the one or more processors 302 enables N1 mode based on determining that the VoNR feature is supported at the RAN level. In an embodiment of the present disclosure, the network is required to trigger corresponding RRC message, such as UE 300 capability information, RRC Reconfiguration, Medium Access Control (MAC) Control Element (CE), and the like whenever network voice support (e.g., EPSFB and VoNR) may change (e.g., the VoNR to the EPS FB support or the EPS FB to the VoNR). Details on introducing the VoNR support at RAN level will be described in greater detail below with reference to FIGS. 11A, 11B, 11C and 11D.

Further, If the UE 300 has the information of RAN VoNR support, the UE 300 may use the information to determine best voice availability. There are two methods to indicate RAN VoNR capability to the UE 300 e.g., a UE capability enquiry and RRC connection reconfiguration. In the UE capability enquiry, the RAN is required to include a newly defined IE to enquire for the UE's VoNR capabilities e.g., proposal to introduce IE for VoNR capability enquiry. Further, in the RRC connection configuration, the RAN is required to include the newly defined IE to indicate RAN's VoNR capabilities e.g., proposal to introduce IE for VoNR capability indication.

In a use-case scenario, the UE 300 establishes a Mobile Originating (MO) call or receive an MT call when the IE is in 5GC. The 5GC triggers the EPS FB. Further, the UE 300 detects that all cells in the frequency associated with the 5GC is in a disabled list of the UE 300. Furthermore, the UE 300 adds the current SA cell in the disabled list.

In another use-case scenario, the UE 300 establishes a Mobile Originating (MO) call or receive an MT call when the IE is in 5GC. The 5GC triggers the EPS PB. Further, the UE 300 detects that the entire tracking area is disabled due to previous reject cause in LTE. Furthermore, the UE 300 puts current N1 mode to 0 until registration area changes.

In an embodiment of the present disclosure, the UE may choose to change the RAT priority order of the 5G SA once UE determines that corresponding LTE cells are not allowed or while the UE determines that the network supports the EPS FB for voice or video calls by identifying the redirection from network for first voice call by UE. In an example scenario, if the UE has RAT priority order as 5G/LTE/3G/2G and LTE is allowed for UE in corresponding tracking area or in the entire PLMN, the UE may change RAT priority order to LTE/3G/2G/5G. The UE may also change the similar RAT priority order while UE initiated a voice or video call and 5G SA network redirects UE to LTE during call set up. In another example scenario, the UE may also change the RAT priority order while the 5G SA network handovers the call during call set up or after call set up as well. The UE may revert back original RAT priority order once corresponding one or more LTE cell, one or more tracking areas or LTE RAT for entire PLMN is removed from the blocked list.

Figure 4A:
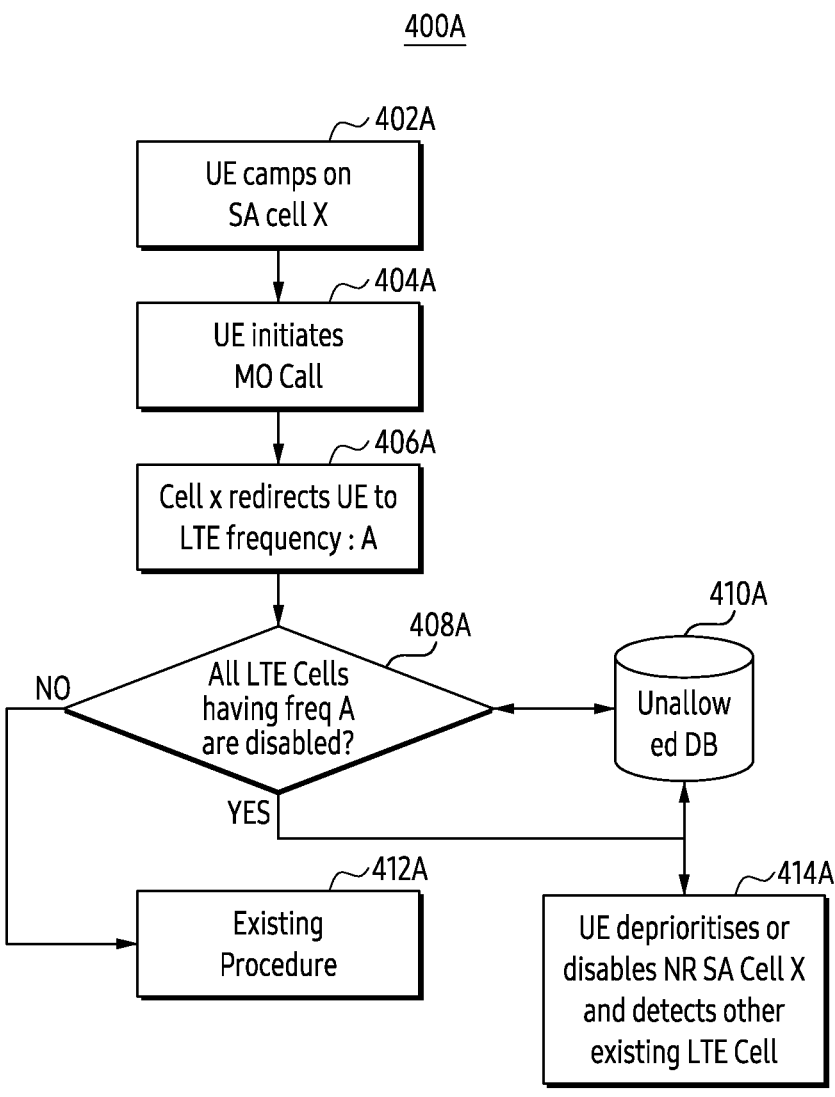
FIG. 4A is a flowchart illustrating an example procedure of disabling a New Radio (NR) Stand Alone (SA) cell, according to various embodiments.

FIG. 4A is a flowchart 400A illustrating an example procedure of disabling an NR SA cell, according to various embodiments. In an embodiment of the present disclosure, the UE 300 supports SA and camps on a SA cell X. The SA cell X supports voice or video calls by the EPS FB.

At 402A, the UE camps on the SA cell X. At 404A, the UE initiates the MO call. Further, at 406A, the SA cell X directs the UE to LTE frequency A. At 408A, it is determined if all LTE cells having frequency A are disabled e.g., added to an unallowed database 410A. At 412A, if all LTE cells having frequency A are not disabled, an existing procedure is performed e.g. call can continue over LTE RAT by performing EPS FB procedure. At 414A, if all LTE cells having frequency A are disabled, the UE disables the NR SA cell X and detects any other existing LTE cell which is not disabled to continue the call. The UE will check all LTE Cells having frequency A is in blacklist or not. In case All LTE Cell having frequency A are in UE blacklist, UE will blacklist NR Standalone Cell x as well. The UE will reselect any LTE Cell belongs to different frequency (Other than A) which is not blacklisted to continue with the call. For this UE can make use of Neighbour cell database for faster camping. This information may be availed from acquisition database if 5G Cell and 4G Cell mapping is available. This will ensure current call may not get dropped as UE can connect with network in LTE. Also in current scenario if current SA cell gets blacklisted it will ensure no further call will be dropped while UE is in SA network. This particular SA cell will be removed from blacklist database as soon as corresponding blacklisted LTE Cell or cells will be removed or USIM removed or UE Switches off/on. Based on procedure, the UE can overcome any further call drops as call will never originate on blacklisted cells.

Figure 4B:
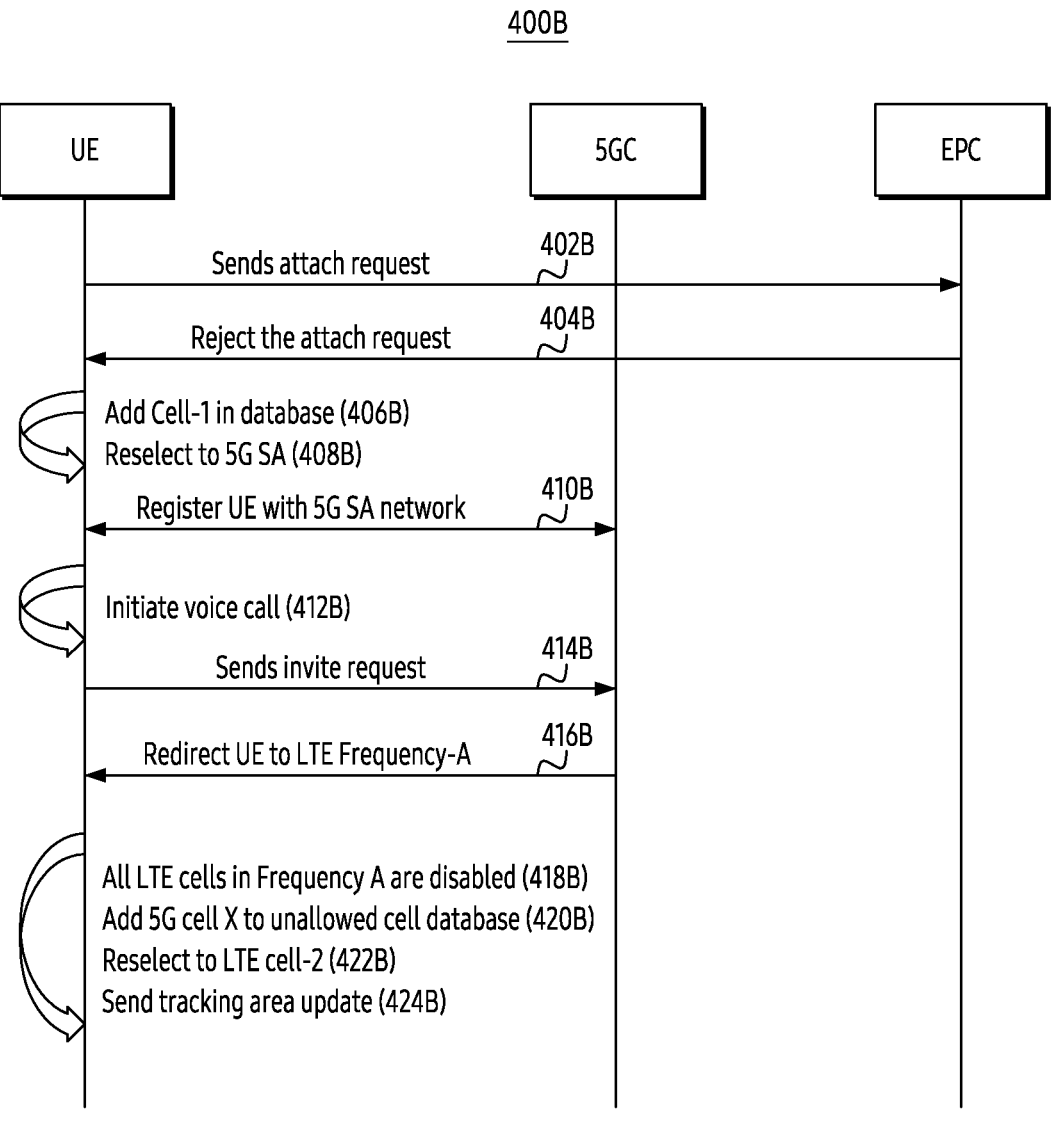
FIG. 4B is a signal flow diagram illustrating an example procedure of disabling SA cells based on redirection to a Long-Term Evolution (LTE) cell, according to various embodiments.

FIG. 4B is a signal flow diagram 400B illustrating an example procedure of disabling SA cells based on redirection to a Long-Term Evolution (LTE) cell, according to various embodiments.

At 402B, the UE 300 sends attach request or Tracking Area Update (TAU) request to LTE Cell-1 (TAI-1). At 404B, the EPC rejects the attach request with EMM cause #15 e.g., tracking area not allowed. At 406B, the UE 300 adds cell-1 (TAI-1) in an unallowed database. At 408B, the UE 300 reselects to 5G SA. At 410B, the UE 300 gets registered with the 5G SA network e.g., Cell X. At 412B, the UE 300 initiates a voice call. At 414B, the sends an invite request to the 5G SA network. At 416B, the 5GC redirects the UE 300 to an LTE frequency A. At 418B, the UE determines that all LTE cells belonging to the frequency A are disabled. At 420B, the UE 300 puts cell X to the unallowed cell database. At 422B, the UE 300 reselects to LTE cell 2 (TAI-2) which belongs to different tracking area and frequency. Further, at 424B, the UE 300 sends tracking area update request to complete the call in EPS FB.

Figure 5A:
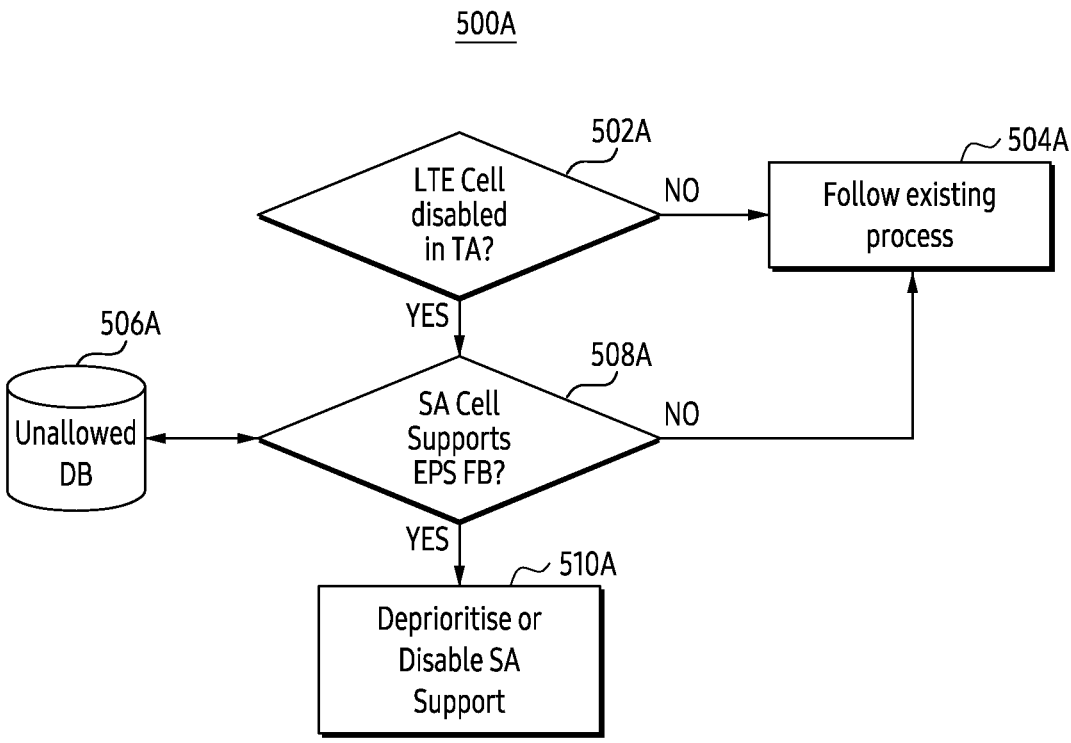
FIG. 5A is a flowchart illustrating an example procedure of disabling SA to avoid call drops, according to various embodiments.

FIG. 5A is a flowchart 500A illustrating an example procedure of disabling SA to avoid call drops, according to various embodiments. In an embodiment of the present disclosure, the UE 300 supports SA and LTE cell or tracking area is disabled.

At 502A, the UE 300 determines if LTE cell is disabled in the current tracking area (TA). If LTE cell is not disabled in the current tracking area, existing procedure is performed at 504A. If the LTE cell is disabled in the current tracking area, the UE 300 determines if SA cells in the current tracking area support VoNR or EPS FB and maintains the call database 506A at 508A. If all NR cells or currently camped SA cell supports the EPS FB in the current tracking area (which is associated with LTE TA), then UE 300 may disable SA support temporarily or deprioritise NR RAT in RAT priority order until LTE cells are also removed from the unallowed cell database at 510A. For example, UE 300 may disable SA Support until UE changes TA or location or timer based and/or current LTE cells are being removed from blacklist or USIM removed or UE switches off/on.

Figure 5B:
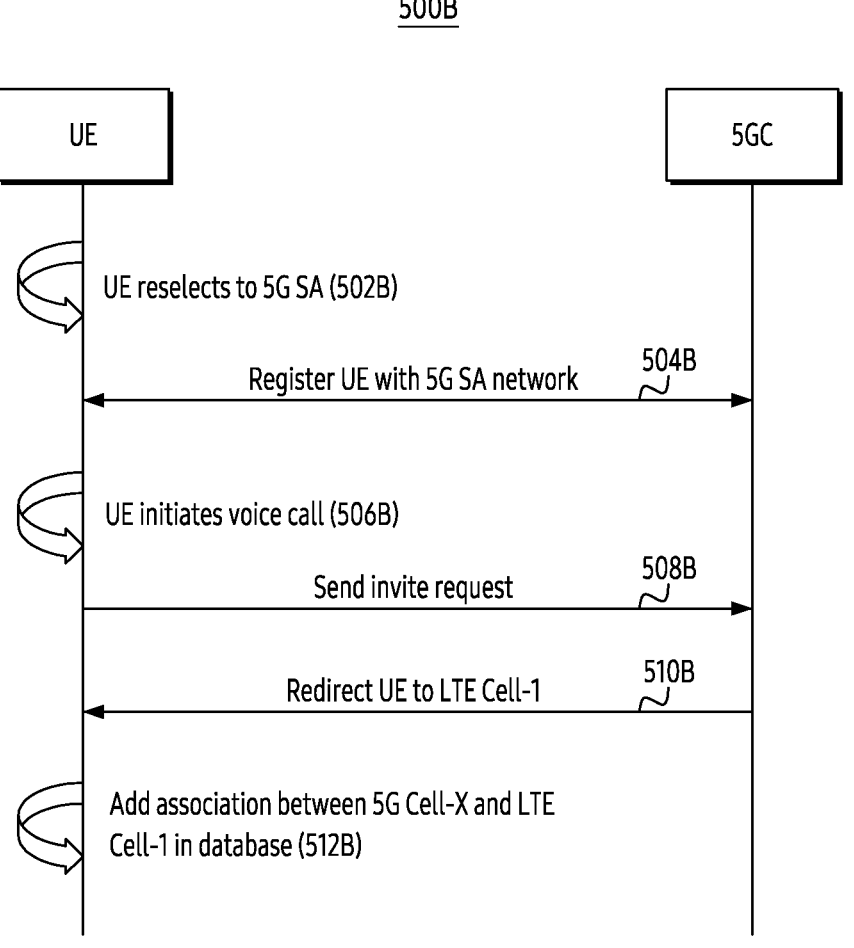
FIG. 5B is a signal flow diagram illustrating an example procedure of handling an unallowed cell database, according to various embodiments.

FIG. 5B is a signal flow diagram 500B illustrating an example procedure of handling the unallowed cell database, according to various embodiments.

At 502B, the UE 300 reselects to 5G SA. Further at 504B, the UE 300 gets registered with SA network e.g., 5G cell X. At 506B, the UE 300 initiates a voice call. Furthermore, at 508B, the UE 300 sends invite request to the 5G SA network. At 510B, the 5GC redirects the UE 300 to LTE cell-1 (TAI-1). At 512B, the UE 300 adds association between the 5G cell X and the LTE cell-1 in the call database.

Figure 5C:
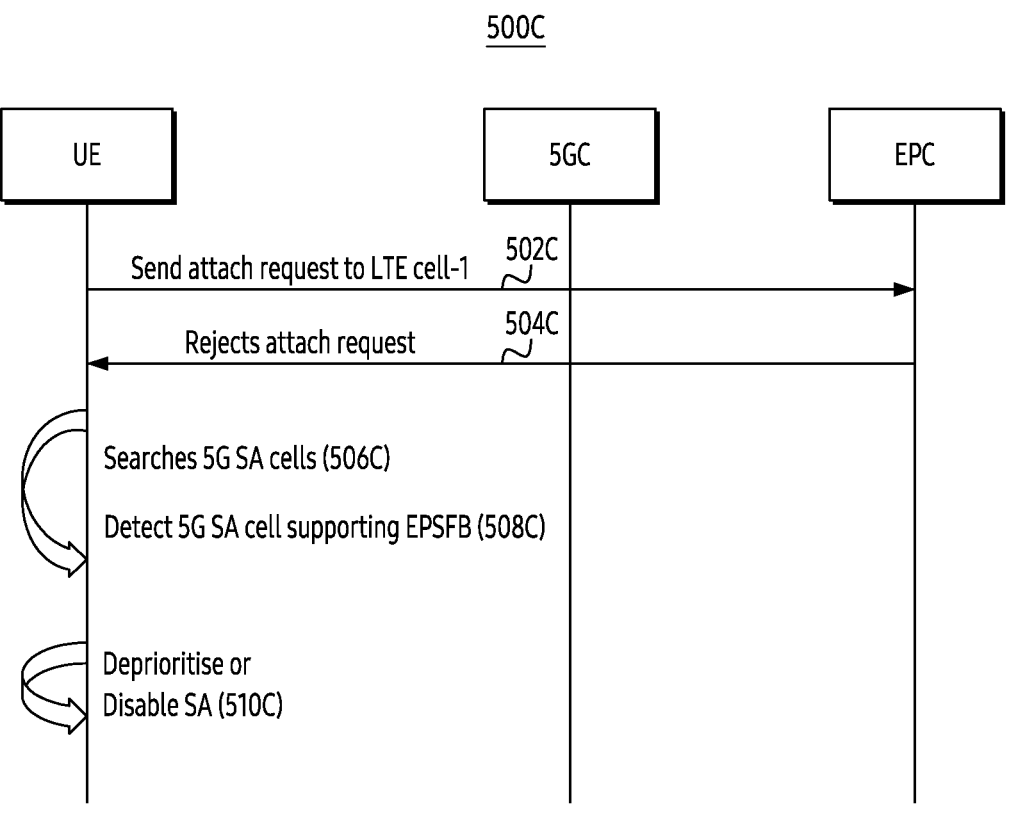
FIG. 5C is a signal flow diagram illustrating an example procedure of disabling SA based on EPS PB support, according to various embodiments.

FIG. 5C is a signal flow diagram 500C illustrating an example procedure of disabling SA based on EPS FB support, according to various embodiment.

At 502C, the UE 300 sends an attach request or a tracking area update request to the LTE Cell-1 (TAI-1). Further, at 504C, EPC rejects the attach request with EMM cause #15 e.g., Tracking Area not allowed. At 506C, the UE 300 searches 5G SA cells. At 508C, the UE 300 detects the 5G SA cell supporting the EPS PH to LTE cells which are disabled from the call database. The UE 300 gets registered with the 5G SA network e.g., 5G cell-x. Further at 510C, the UE 300 disables the SA until it changes the tracking area or location.

Figure 6A:
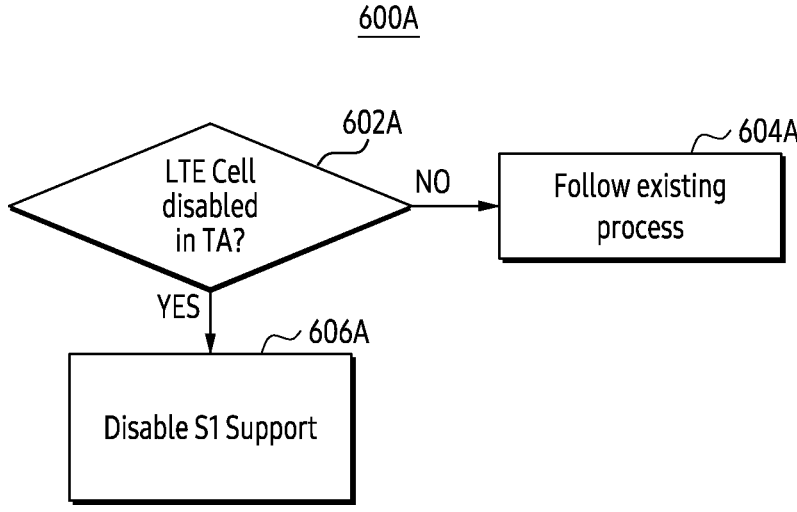
FIG. 6A is a flowchart illustrating an example procedure of disabling an S1 mode support, according to various embodiments.

FIG. 6A is a flowchart 600A illustrating an example procedure of disabling an S1 mode support, according to various embodiments. In an embodiment of the present disclosure, the UE 300 supports the SA and the LTE cell, or the tracking area is disabled.

At 602A, the UE 300 determines if the LTE cell is disabled in the current tracking area. If the LTE cell is not disabled in the current tracking area, an existing process is followed at 604A e.g., the EPS FB call can continue over LTE RAT after the UE is being redirected to EPC from 5G SA. If the LTE cell is disabled in the current tracking area, the UE 300 may disable the S1 mode support while sending the registration request to the SA network at 606A. In an embodiment of the present disclosure, the S1 mode may be disabled until the UE 300 changes the tracking area, location, current LTE cells are removed from the unallowed database, the USIM is removed, the UE 300 switches off/on while registered on the NR, and the like. In an embodiment of the present disclosure, the S1 mode support information allows the network to take decision if the UE 300 is required to stay on the SA cell (in case NW supports VoNR) or the UE 300 should be redirected to other RATs (in case VoNR is not supported). The disablement of the S1 mode allows the UE 300 to overcome any call drops. This process may require network handling e.g., the network taking proper decision based on the S1 mode support indication.

Figure 6B:
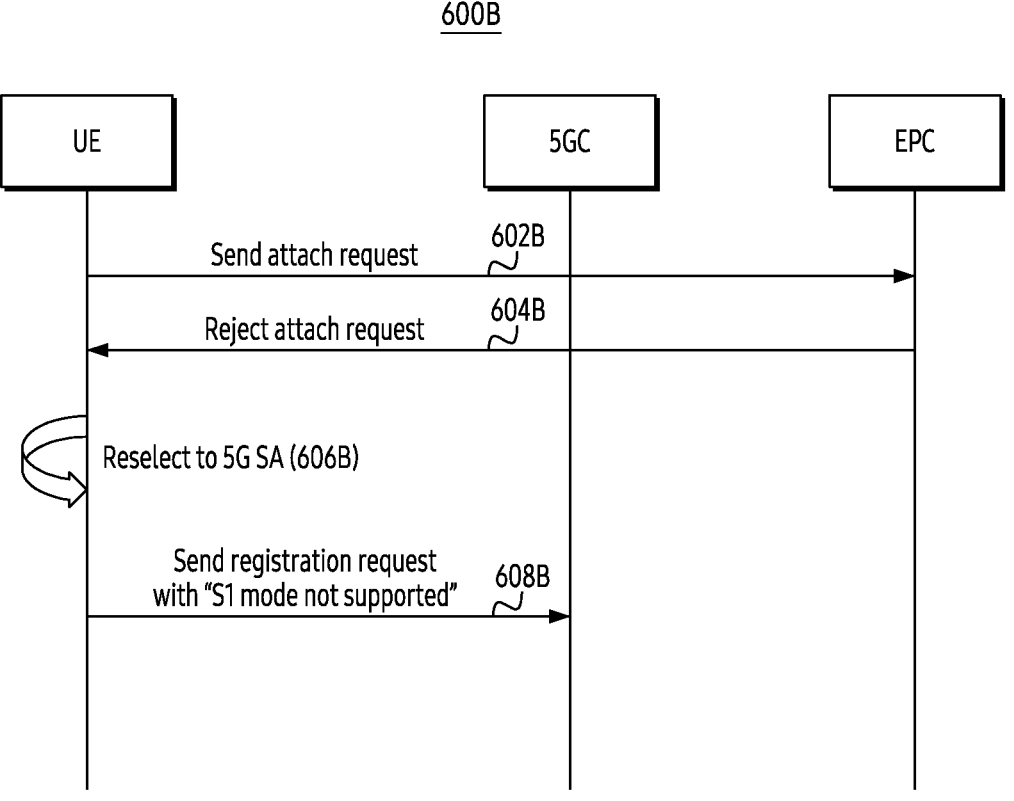
FIG. 6B is a signal flow diagram illustrating an example procedure of disabling the S1 mode support, according to various embodiments.

FIG. 6B is a signal flow diagram 600B illustrating an example procedure of disabling the S1 mode support, according to various embodiments.

At 602B, the UE 300 sends an attach request or a tracking area update request to LTE Cell-1 (TAI-1). At 604B, the EPC rejects the attach request with the EMM cause #15 e.g., tracking area not allowed. At 606B, the UE 300 reselects to the 5G SA. At 608B, the sends a registration request with "S1 mode not supported" indication to the 5GC.

Figure 7:
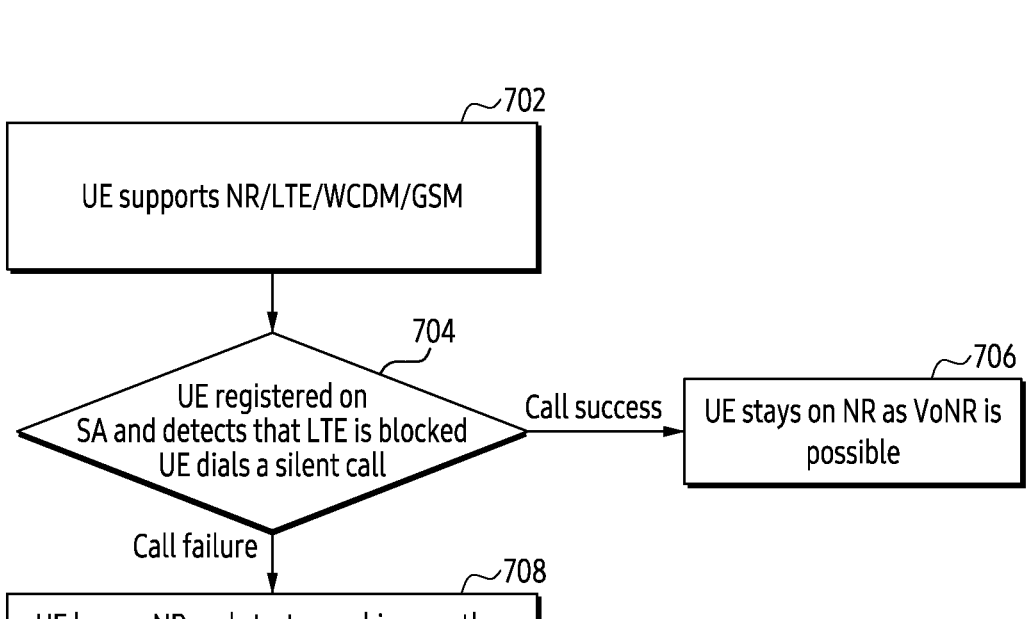
FIG. 7 is a flowchart illustrating an example process of identifying a VoNR support based on a call status, according to various embodiments.

FIG. 7 is a flowchart 700 illustrating an example of identifying a VoNR support based on a call status, according to various embodiments.

At 702, it is determined that the UE 300 supports NR/LTE/WCDM/GSM, and the UE 300 blocked the LTE. At 704, the UE 300 registers on the SA and detects that the LTE is blocked. Further, the UE 300 also dials the silent call. If the silent call is successful, the UE 300 stays on the NR as the VoNR is successful at 706. If the silent call fails, the UE 300 leaves the NR and start searching another RAT/PLMN which can provide voice connectivity at 708.

Figure 8:
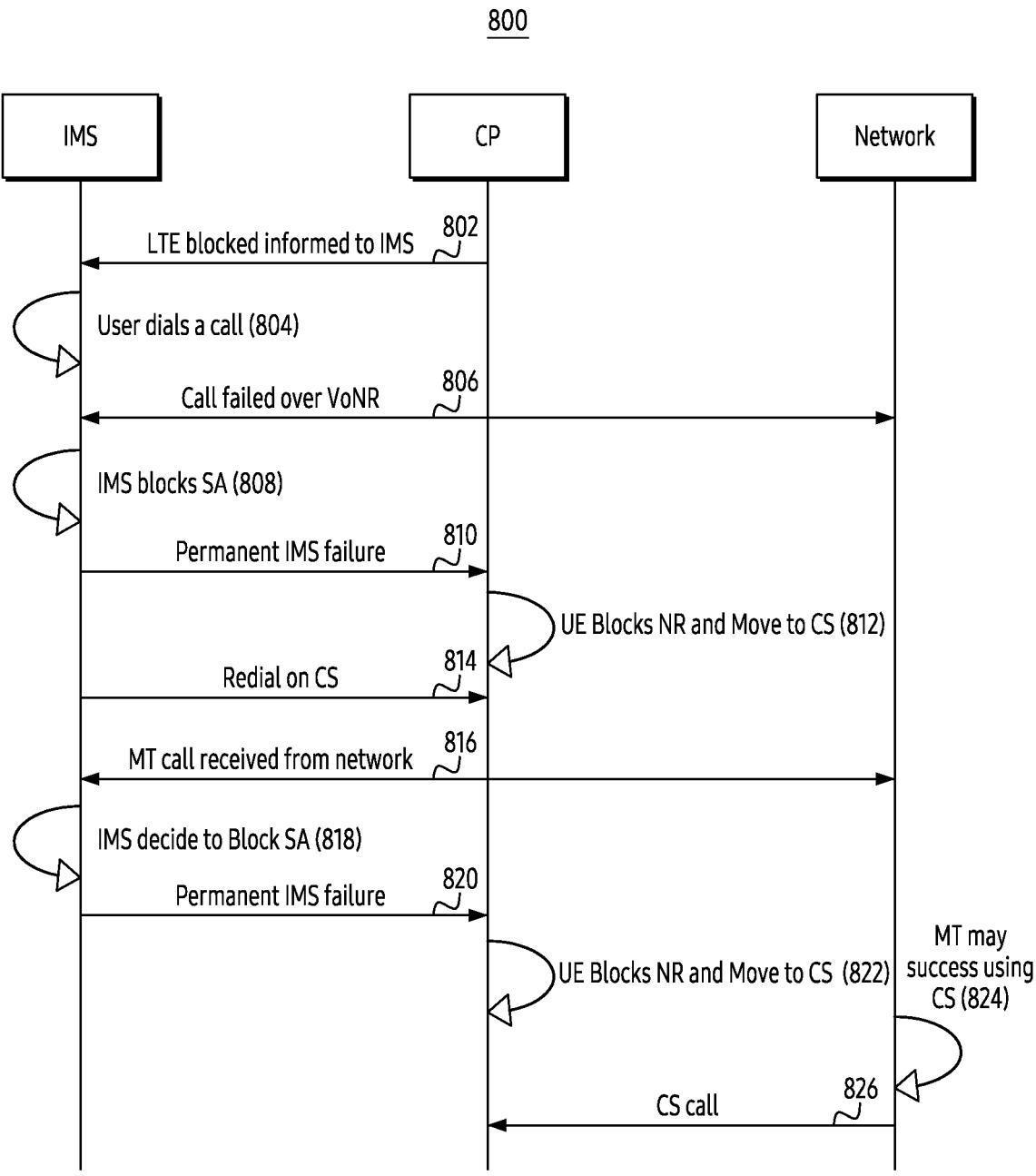
FIG. 8 is a signal flow diagram illustrating an example of allowing the UE to dial a Circuit Switched (CS) call, according to various embodiments.

FIG. 8 is a signal flow diagram 800 illustrating an example of allowing the UE 300 to dial a Circuit Switched (CS) call, according to various embodiments. In an embodiment of the present disclosure, the UE 300 supports NR/LTE/Wideband Code Division Multiple Access (WCDM)/GSM. Further, the UE 300 blocked LTE due to any failure. The UE 300 is connected over SA and can use VoNR.

At 802, the CP informs the IMS that the LTE is blocked. At 804, the user dials the call. At 806, the call fails over the VoNR. At 808, the IMS decides to block the SA. Further at 810, the IMS notifies the CP about the permanent IMS failure. At 812, the UE 300 blocks or deprioritizes NR and moves to CS. The UE 300 redials the call on CS at 814. Furthermore, at 816, the MT call is received from the network. However, the call is not completed using the VoNR. At 818, the IMS decides to block the SA. At 820, there is a permanent IMS failure. At 822, the UE 300 blocks or deprioritizes the NR and moves to the CS. Further at 824, the next MT may be successful using the CS. At 826, the CS call is successfully completed.

Figure 9:
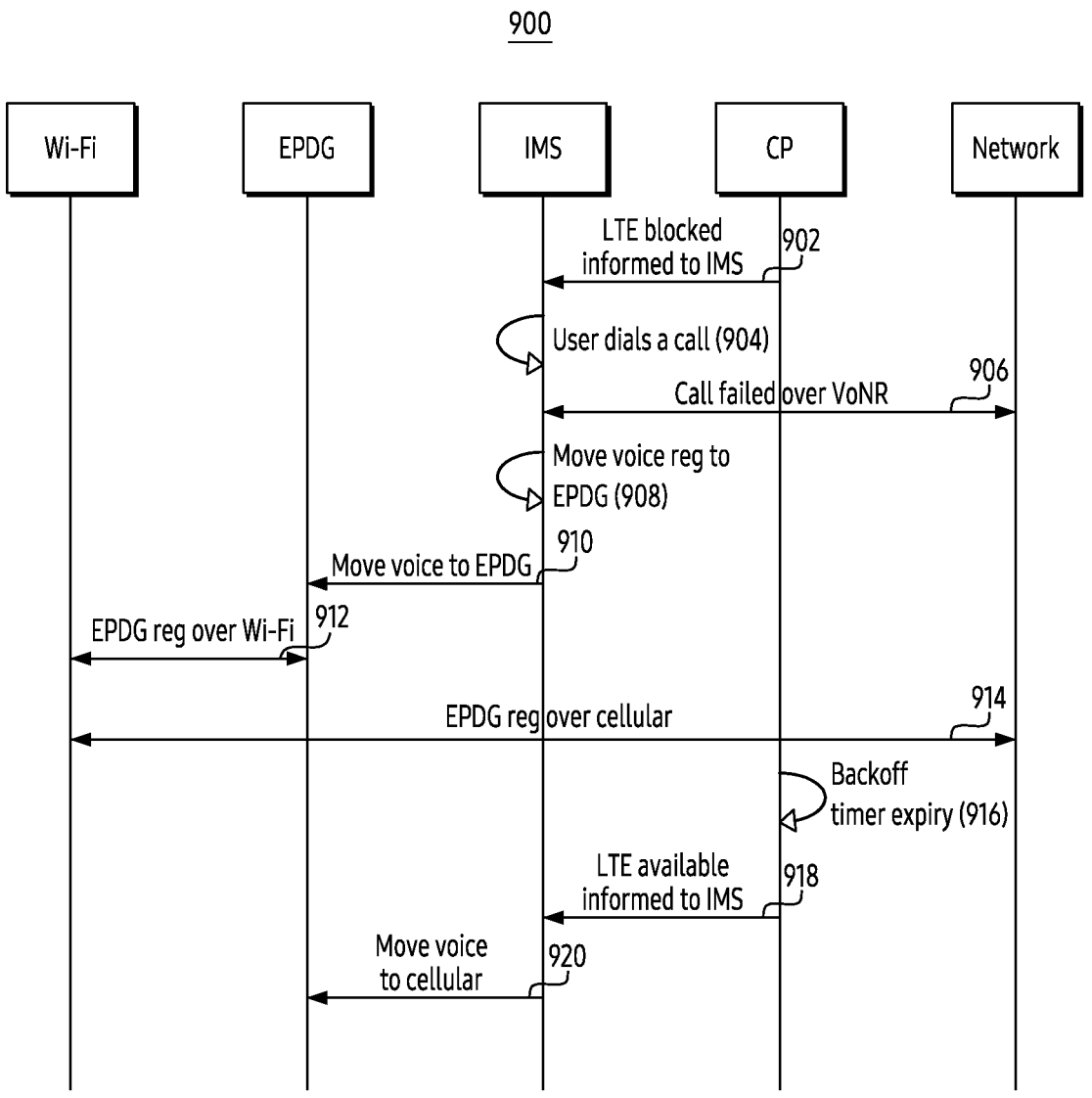
FIG. 9 is a signal flow diagram illustrating an example of allowing the UE to move to Evolved Packet Data Gateway (EPDG), according to various embodiments.

FIG. 9 is a signal flow diagram 900 illustrating an example of allowing the UE 300 to move to the EPDG, according to various embodiments. In an embodiment of the present disclosure, the UE 300 supports NR/LTE/WCDM/GSM. Further, the UE 300 blocked LTE due to any failure. The UE 300 is connected over SA and can use VoNR.

At 902, the CP informs the IMS that the LTE is blocked. At 904, the user dials the call. At 906, the call fails over VoNR. At 908, the IMS decides to move the voice registered to the EPDG. Further at 910, the IMS moves voice to EPDG. At 912, the EPDG is registered over the Wi-Fi. Further, the EPDG is registered over the cellular network at 914. Furthermore, at 916, the backoff timer expires. At 918, the CP notifies the IMS that the LTE is available. At 920, the voice is moved to the cellular network.

Figure 10A:
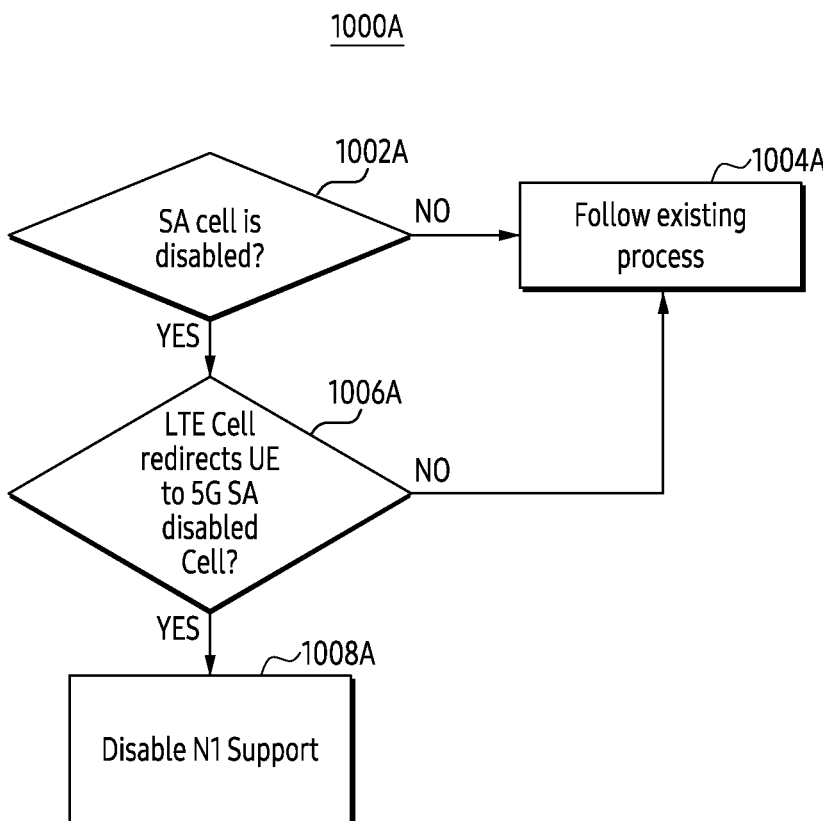
FIG. 10A is a flowchart illustrating an example of disabling an N1 mode support, according to various embodiments.

FIG. 10A is a flowchart 1000A illustrating an example of disabling an N1 mode support, according to various embodiments. In an embodiment of the present disclosure, the UE 300 supports the SA.

At 1002A, it is determined of the SA cell is disabled for the UE 300 in the current registration area. If the SA cell is not disabled in the current registration area, the UE 300 follows the existing process at 1004A, the UE may register over NR SA. If the SA cell is disabled in the current registration area, the UE 300 redirects the LTE cell to 5G SA at 1006A. At 1008A, the UE 300 disables the N1 Support or deprioritizes the NR RAT until the UE 300 changes the tracking area, location, the USIM is removed, the UE 300 switches off/on, or any combination thereof.

Figure 10B:
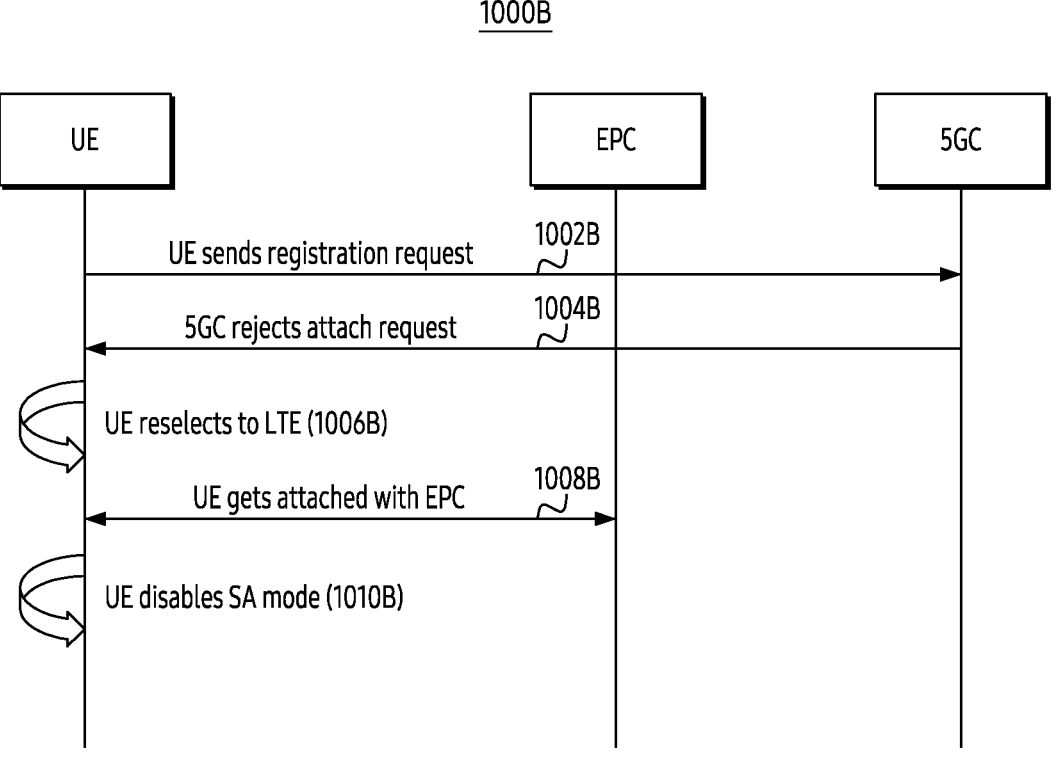
FIG. 10B is a signal flow diagram illustrating an example of disabling an N1 mode support, according to various embodiments.

FIG. 10B is a signal flow diagram 1000B illustrating an example of disabling an N1 mode support, according to various embodiments.

At 1002B, the UE 300 sends Registration Request to a 5G SA cell-1 (e.g., TAI 1). Further, at 1004B, the 5GC rejects attach with EMM cause #15 e.g., tracking area not allowed. At 1006B, the UE 300 reselects to the LTE. At 1008B, the UE 300 gets attached with the EPC. At 1010B, the network redirects the UE 300 to the 5G SA cell-1 (e.g., TAI 1). At 1012B, the UE 300 disables or deprioritises the SA mode/N1 mode and return to the LTE as the 5G SA cell-1 is disabled until UE 300 changes TA, location, the USIM is removed, the UE 300 switches off/on, or any combination thereof.

Figure 11A:
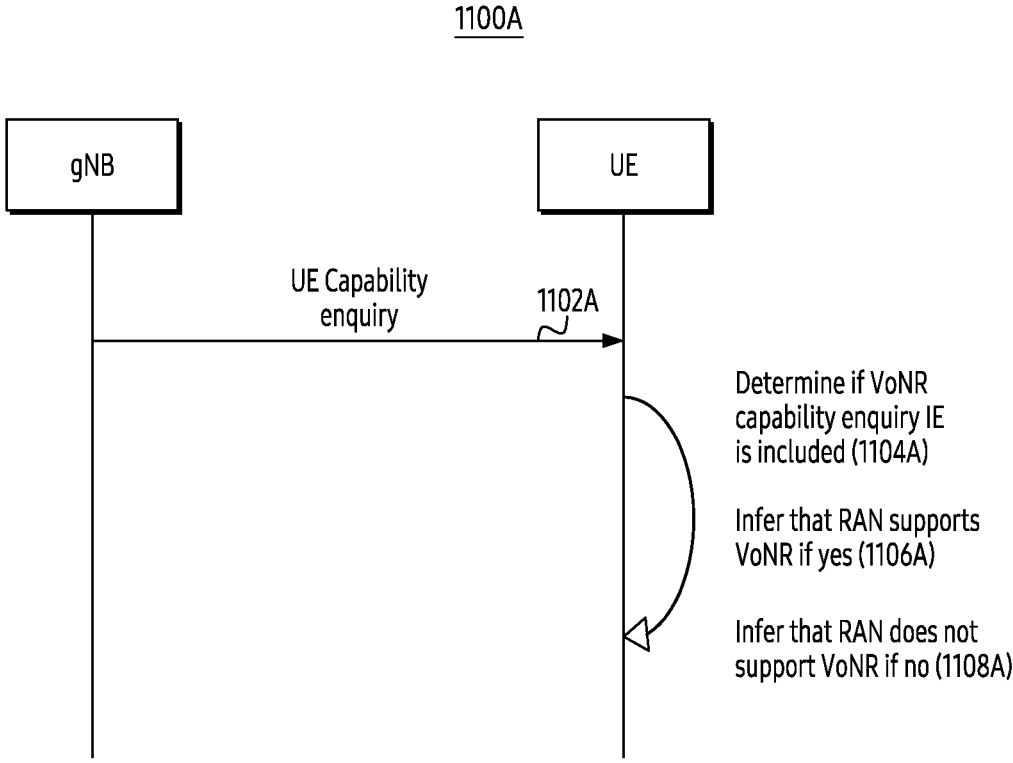
FIG. 11A is a signal flow diagram illustrating an example of indicating VoNR capability to the UE using a UE capability enquiry method, according to various embodiments.

FIG. 11A is a signal flow diagram 1100A illustrating an example of indicating VoNR capability to the UE 300 using a UE 300 capability enquiry method, according to various embodiments. At 1102A, the gNB sends a UE 300 capability enquiry to the UE 300. At 1104A, the UE 300 determines if the VoNR capability enquiry IE is included. If yes, the UE 300 infers that the RAN supports the VoNR and reports UE's VoNR capability at 1106A. If no, the UE 300 infers that RAN does not support VoNR and the RAN supports EPSFB only at tep 1108A.

Figure 11B:
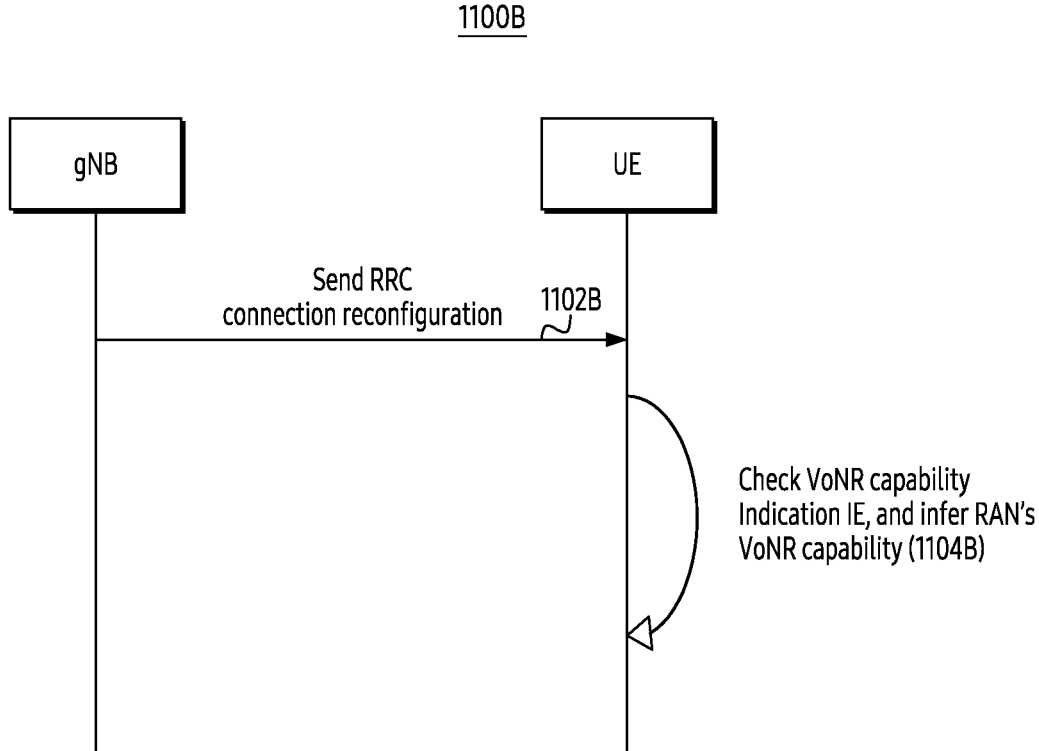
FIG. 11B is a signal flow diagram illustrating an example of indicating VoNR capability to the UE using an RRC connection reconfiguration, according to various embodiments.

FIG. 11B is a signal flow diagram 1100B illustrating an example of indicating VoNR capability to the UE 300 using an RRC connection reconfiguration, according to various embodiments.

At 1102B, the gNB shares the RRC connection reconfiguration e.g., VoNR capability indication IE to the UE 300. Further, at 1104B, the UE 300 checks the VoNR capability Indication IE, and infers RAN's VoNR capability.

Figure 11C:
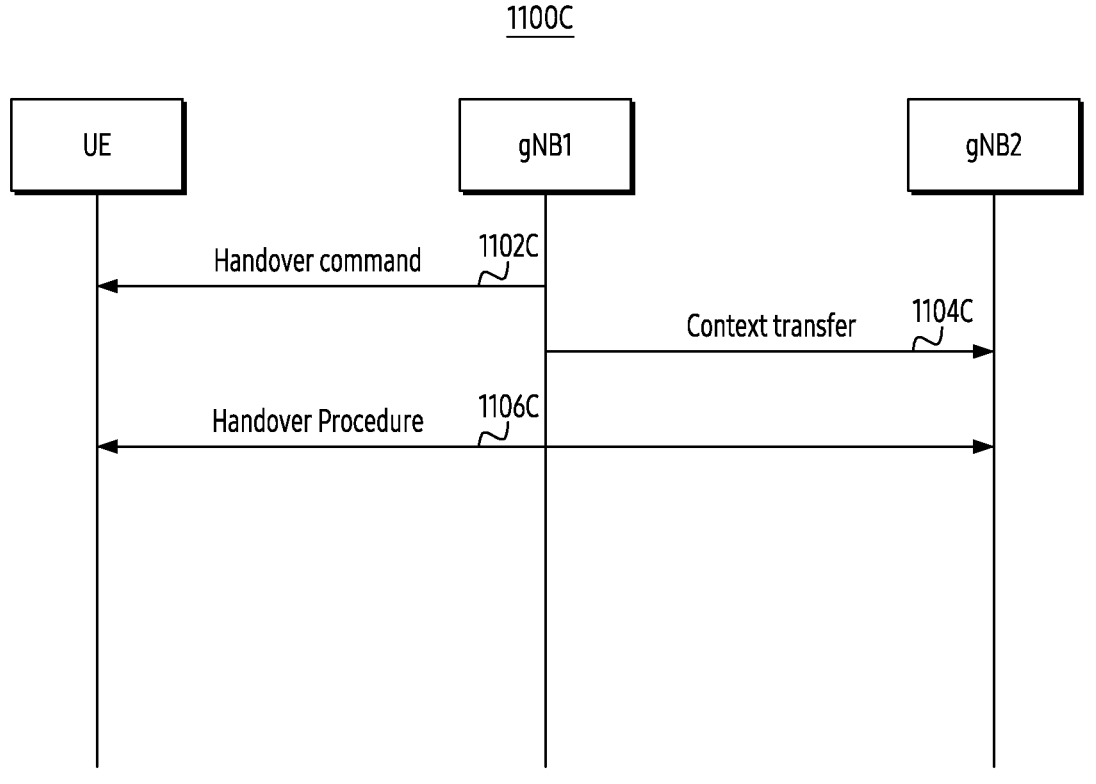
FIG. 11C is a signal flow diagram illustrating an example procedure of handover using a UE capability method, according to various embodiments.

FIG. 11C is a signal flow diagram 1100C illustrating an example procedure of handover using a UE 300 capability method, according to various embodiments.

At 1102C, the UE 300 sends a handover command to the gNB1. Further, at 1104C, context transfer is performed by the UE 300. In an embodiment of the present disclosure, the gNB2 checks the UE's VoNR capability. The UE 300 supporting the VoNR: implies gNB1 supports the VoNR. In an embodiment of the present disclosure, the UE 300 may report the VoNR capability only if the gNB1 enquires the VoNR capability, so gNB1 supports the VoNR. If the gNB2 does not support the VoNR, the network triggers the UE 300 capability enquiry after the handover completion. If the UE 300 does not support the VoNR, it indicates that the gNB1 VoNR capability cannot be derived. The gNB2 may trigger the UE 300 capability enquiry after the handover completion. At 1106C, the handover procedure is completed.

Figure 11D:
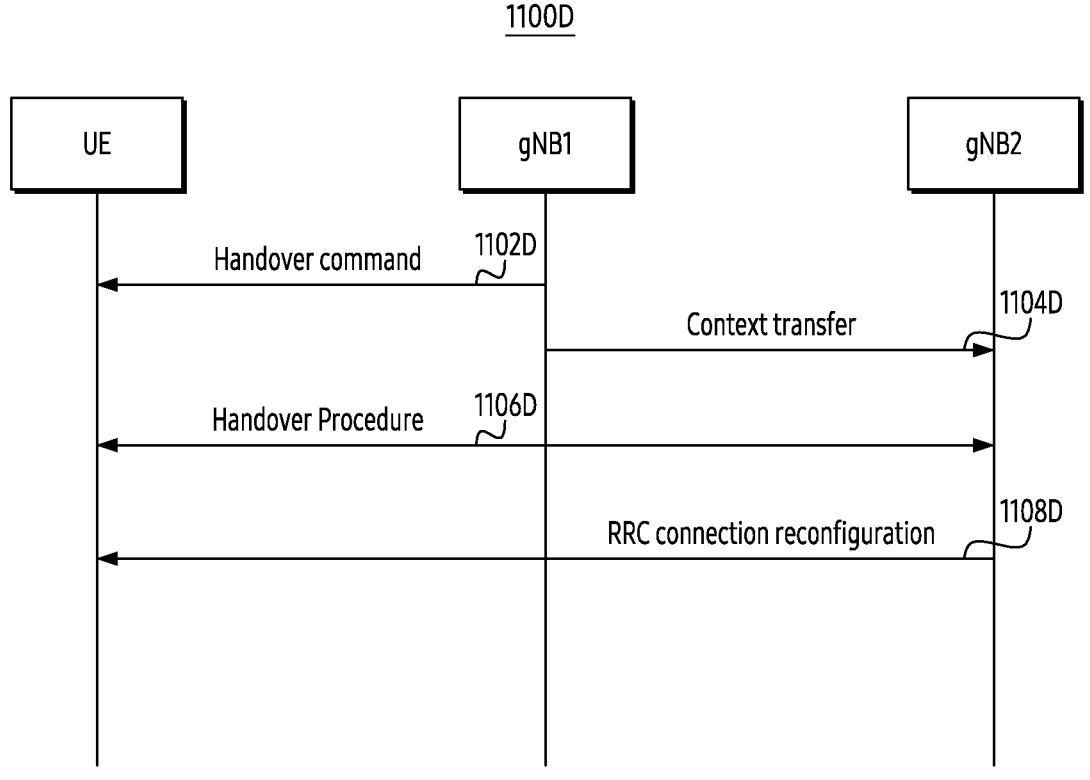
FIG. 11D is a signal flow diagram illustrating an example procedure of handover using RRC connection reconfiguration method, according to various embodiments.

FIG. 11D is a signal flow diagram 1100D illustrating an example procedure of handover using RRC connection reconfiguration method, according to various embodiments.

At 1102D, the UE 300 sends a handover command to the gNB1. Further, at 1104D, context transfer is performed by the UE 300. At 1106D, the handover procedure is completed. In an embodiment of the present disclosure, the gNB2 always sends the RRC connection reconfiguration to indicate the RAN VoNR capability after the handover completion. At 1108D, the gNB2 sends the RRC connection reconfiguration e.g., VoNR capability indication IE, to the UE 300.

Figure 12:
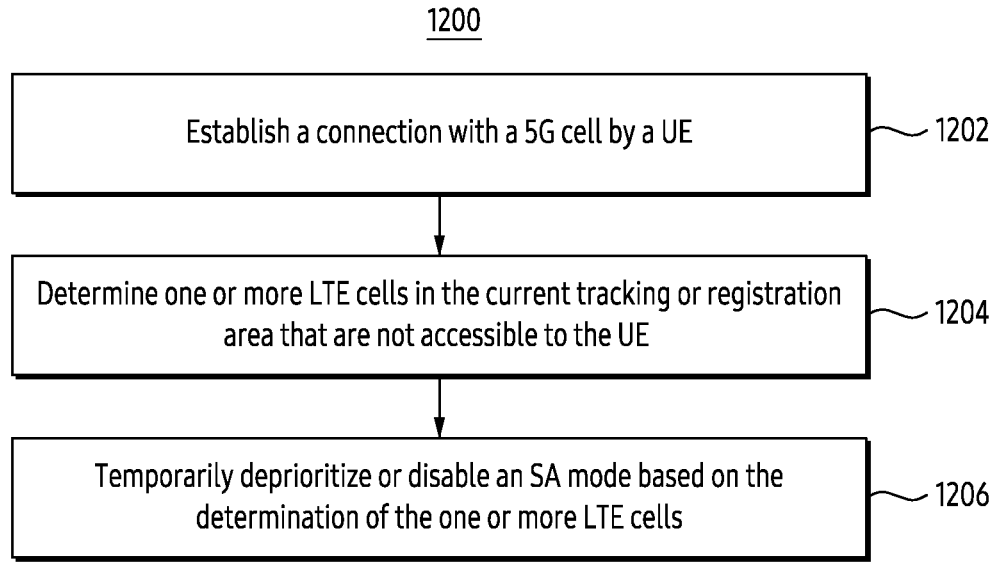
FIG. 12 is a flowchart illustrating an example method implemented in the UE for connection management, according to various embodiments.

FIG. 12 is a flowchart illustrating an example method 1200 implemented in a User Equipment (UE) 300 for connection management, according to various embodiments. Further, a detailed description of the method 1200 may not be provided here for the sake of brevity.

At 1202, the method 1200 includes establishing a connection of the UE 300 with a 5G cell. In an embodiment of the present disclosure, the established connection with the 5G cell is in a current tracking area of a 5G New Radio (NR). The method 1200 includes detecting, after establishing the connection with the 5G cell, that the UE 300 is redirected by the 5G NR from the 5G cell to one or more Long-Term Evolution (LTE) cells associated with an LTE frequency in the current tracking area. In an embodiment of the present disclosure, the one or more LTE cells are configured to operate on the LTE frequency. In detecting that the UE is redirected by the 5G NR from the 5G cell to the one or more LTE cells, the method 1200 includes associating the 5G cell with the LTE frequency of the one or more LTE cells in an acquisition database upon the redirection of the UE 300 from the 5G cell to the one or more LTE cells. Further, the method 1200 includes transmitting an invitation request to the 5G NR based on the established connection. In an embodiment of the present disclosure, the invitation request indicates an initiation of an incoming call or an outgoing call.

Furthermore, the method 1200 includes determining the one or more LTE cells in the current tracking area or registration area that are not accessible to the UE 300. In determining the one or more LTE cells in the current tracking area or the registration area that are not accessible to the UE 300, the method 1200 includes disabling the 5G cell associated with the LTE frequency where the one or more LTE cells are not accessible. In an embodiment of the present disclosure, the 5G cell is added to an unallowed cell database by the UE 300. Further, the method 1200 includes identifying an LTE cell associated with a new tracking area. In an embodiment of the present disclosure, the identified LTE cell is configured to operate on a new LTE frequency. Further, the unallowed cell database excludes a listing of the new LTE frequency and the identified LTE cell. Furthermore, the method 1200 includes removing the 5G cell from the unallowed cell database based on a predefined criterion in response to determining that the one or more LTE cells are removed from the unallowed cell database. In an example embodiment of the present disclosure, the predefined criterion may be removal of the or more LTE cells are from the unallowed cell database, a removal of a Universal Subscriber Identity Module (USIM), switching the UE 300 ON or OFF, and the like. Details on UE's response to the determination of the one or more LTE cells inaccessible to the UE 300 have been described in detail above with reference to FIGS. 4A and 4B.

Further, at 1204, the method 1200 includes determining if SA cells in a current registration area supports the Voice over New Radio (VoNR) or the EPS FB.

At 1206, the method 1200 includes temporarily disabling or deprioritizing an SA mode based on the determination that all NR cells or currently camped SA cell supports the EPS FB in the current registration area associated with LTE tracking area and the determination of the one or more LTE cells in the current tracking area or the registration area that are not accessible to the UE 300. Details on temporarily disabling or deprioritizing the SA mode have been explained in detail above with reference to FIGS. 5A, 5B and 5C. In an embodiment of the present disclosure, the SA mode is temporarily disabled or deprioritized for reducing a call drop until an occurrence of a change in the established connection from the current tracking area to a new tracking area, a completion of a predetermined amount of time after disabling the SA mode, a removal of the one or more LTE cells from the unallowed cell database, or any combination thereof.

In determining that the one or more LTE cells in the current tracking area are not accessible, the method 1200 includes temporarily disabling an S1 mode for reducing a call drop until an occurrence of a change in the established connection from the current tracking area to a new tracking area, a completion of a predetermined amount of time after disabling the S1 mode, a removal of the one or more LTE cells from the unallowed cell database, or any combination thereof. Further, the method 1200 includes transmitting a registration request to the 5G NR. In an embodiment of the present disclosure, the registration request includes a message indicating that the S1 mode is not supported by the UE 300. Details on transmission of the registration request to the 5G NR have been described in detail above with reference to FIGS. 6A and 6B.

In temporarily disabling the S1 mode, the method 1200 includes dialing a call over the 5G NR without user intervention. In an embodiment of the present disclosure, the call corresponds to a test call, or a silent call dialed without informing the user. For example, if the SA mode is disabled, the call may be initiated on LTE or lower RATs as per applicability. Further, the method 1200 includes determining, based on the dialed call, whether the UE 300 is supported by the VoNR in the 5G NR in response to temporarily disabling the S1 mode. If the dialed call is successful, it is possible to support VoNR on the UE 300 and the UE 300 can stay on NR. The method 1200 includes disconnecting with the NR and search a new RAT/Public Land Mobile Network (PLMN) for initiating the incoming call or the outgoing call when it is determined that the call fails, and the UE 300 is unsupported by the VoNR. The new RAT/PLMN provide the voice connectivity. Details on UE's response to the determination that the UE 300 is supported by the VoNR have been explained in detail above with reference to FIG. 7.

When the UE 300 is supported by the VoNR and the S1 mode is temporarily disabled, the method 1200 includes detecting a failure in the initiation of the incoming call or the outgoing call in the 5G NR. Further, the method 1200 includes permanently disabling the SA mode in the 5G NR based on the detected failure. The one or more processors 302 of the UE 300 also switch to a 3G network from the 5G NR supporting the SA mode for initiating the incoming call or the outgoing call. Details on response of the UE 300 to the determination that the UE 300 is supported by the VoNR and the S1 mode is temporarily disabled has been explained in detail above with reference to FIG. 8.

In detecting the failure in the initiation of one of the incoming call or the outgoing call in the 5G NR, the method 1200 includes switching to an Evolved Packet Data Gateway (EPDG) network from the 5G NR. In an embodiment of the present disclosure, the switching to the EPDG network is performed over Wireless-Fidelity (Wi-Fi) by registering the UE 300 in the EPDG over Wi-Fi for initiating the incoming or the outgoing call. For example, If Wi-Fi is available and the EPDG connection is possible over the Wi-Fi, move voice registration to the EPDG (Wi-Fi). Details on switching to the EPDG have been described in detail above with reference to FIG. 9. Further, the method 1200 includes performing an EPDG registration over a cellular network when a UE 300 registration with the EPDG network is unsuccessful over the Wi-Fi.

Figure 13:
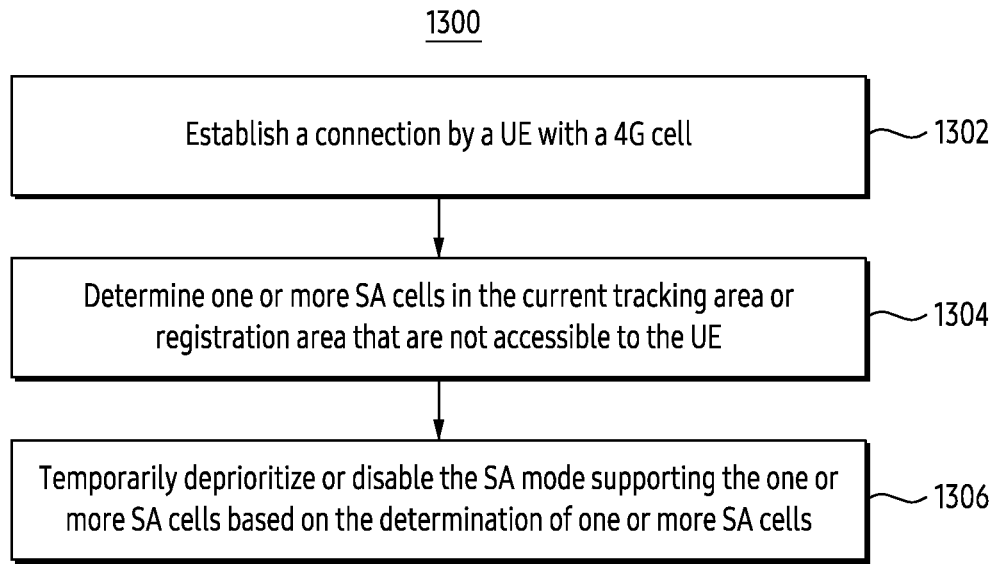
FIG. 13 is a flowchart illustrating an example method implemented in the UE for reducing service loss in a stand alone (SA) mode of the UE, according to various embodiments.

FIG. 13 is a flowchart illustrating an example method 1300 implemented in the UE 300 for reducing service loss in a Stand Alone (SA) mode of the UE 300, according to various embodiments. Further, a detailed description of the method 1300 may not be provided here for the sake of brevity.

At 1302, the method 1300 includes establishing a connection with a 4G cell. In an embodiment of the present disclosure, the established connection with the 4G cell is in a current tracking area of the 4G LTE. In an embodiment of the present disclosure, the method 1300 includes detecting, after establishing the connection with the 4G cell, that the UE 300 is redirected by the 4G LTE from the 4G cell to one or more SA cells associated with the NR frequency in the current tracking area.

Further, at 1304, the method 1300 includes determining the one or more SA cells in the current tracking area or the registration area that are not accessible to the UE 300. In an embodiment of the present disclosure, the one or more SA cells are configured to operate on a NR frequency.

At 1306, the method 1300 includes temporarily disabling or deprioritizing the SA mode or 5G RAT supporting the one or more SA cells based on the determination of one or more SA cells in the current tracking area or the registration area that are not accessible to the UE 300. In an embodiment of the present disclosure, the SA mode is temporarily disabled or deprioritized for reducing the call drop until an occurrence of a change in the established connection from the current tracking area to a new tracking area, a completion of a predetermined amount of time after disabling the SA mode, a removal of the one or more SA cells from the unallowed cell database, or any combination thereof.

In a scenario, the UE 300 supports the SA, and the SA is disabled for UE 300 in a current tracking area. Further, the LTE is redirecting the UE 300 to 5G SA. The method 1300 includes disabling N1 mode support while sending attach or tracking area update request to the LTE. In an embodiment of the present disclosure, the N1 mode remains disabled until the UE 300 changes tracking area, location, the USIM is removed, the UE 300 switches off/on, or any combination thereof. The temporarily disablement of the N1 mode allows the UE 300 to overcome no service for around 1 minute. Details on temporarily disabling the N1 have been described in detail above with reference to FIGS. 10A and 10B.

In temporarily disabling or deprioritizing the SA mode, the method 1300 includes setting a RAT selection priority to Universal Mobile Telecommunications System (UMTS) and Global System for Mobile communication (GSM). In an embodiment of the present disclosure, the RAT selection priority is order of scanning or prioritising each RAT type. For example, if the RAT selection priority is 5G>4G>3G>2G, the UE 300 may first attempt to acquire and scan 5G RAT followed by 4G RAT, followed by 3G RAT and lastly 2G RAT if no other RAT is present or providing required services. Further, the method 1300 includes deprioritizing the SA mode to be lowest in a RAT selection table. In an embodiment of the present disclosure, the SA mode corresponds to an NR RAT. The RAT selection table includes the RAT selection priority.

Further, the 5G NR notifies to the 4G LTE that the 5G cell and the one or more SA cells are disabled and added to the unallowed cell database. In an example embodiment of the present disclosure, 5GC or EPC may exchange information associated with disabled cells or tracking area code in between them for each UE 300. Furthermore, the 4G LTE notifies to the 5G NR that the 4G cell and the one or more LTE cells are disabled and added to the unallowed cell database. In an example embodiment of the present disclosure, 5G RAT e.g., Next Generation (NG)—evolved NodeB (eNB) or 4G RAT e.g., eNB may exchange information associated with disabled cells or tracking area code in between them for each UE 300. The exchange of such information allows the network to stop unnecessary routing to the unallowed cell database or avoid any call drop. Further, the network is always required to take disabled information of other RAT into account before redirecting the UE 300 to other RAT during a call.

Furthermore, the method 1300 includes receiving a new Information Element (IE) or an existing IE from a 5G SA network to indicate Voice over New Radio (VoNR) feature support at a Radio Access Network (RAN) level. In an embodiment of the present disclosure, the IE is associated with a dedicated message or a broadcasted message in a Radio Resource Control (RRC) or a MAC layer, such as UE 300 capability information, RRC Reconfiguration, MAC CE configuration, and the like. Further, the method 1300 includes determining if the VoNR feature is supported at the RAN level based on the received new IE or the received existing IE. In an embodiment of the present disclosure, a presence of the new IE or the existing IE indicates a RAN level support for the VoNR feature or EPS FB support. In an embodiment of the present disclosure, an absence of the new IE or the existing IE indicates the EPS FB support at the RAN Level or VoNR support at the RAN Level. Further, the method 1300 includes enabling N1 mode based on determining that the VoNR feature is supported at the RAN level.

In an embodiment of the present disclosure, the network is required to trigger corresponding RRC message, such as UE 300 capability information, RRC Reconfiguration, Medium Access Control (MAC) Control Element (CE), and the like whenever network voice support (e.g., EPSFB and VoNR) may change (e.g., the VoNR to the EPS FB support or the EPS FB to the VoNR). Details on introducing VoNR support at RAN level have been described in detail above with reference to FIGS. 11A, 11B, 11C and 11D.

The disclosure may provide the following example advantages:

1) The present disclosure reduces call drops in scenarios where the call cannot be proceeded on 4G RAT as all cells in 4G are disabled. The UE blocks corresponding SA cell which may redirect the UE (EPSFB) to one or more LTE cells which are disabled. If the 5GC redirects UE to an LTE frequency A during EPSFB call, the UE checks if all LTE cells having frequency A are in the unallowed database. In case all the LTE cells having frequency A are in the unallowed database, the UE may disable NR standalone cell as well until the LTE cells are in the unallowed database. The UE reselects any LTE Cell belonging to different frequency (other than A) which is not disabled to continue with the call. This ensures that the UE does not connect to the same SA cell which is associated with only disabled LTE cells.

2) The present disclosure allows the UE to identify all the LTE cells in the tracking area or registration area that are disabled, and the UE may disable N1 mode if the UE determines that the cells in the current registration area supports call over EPSFB. The UE can also retry the same call in lower RATs if the LTE is not present to support the current call due to disabled cells.

3) The present disclosure reduces a no service issue where 5G data services are provided on other SIM. In an embodiment of the present disclosure, the current SIM is unable to provide data services on 5G due to multiple reasons, such as Service Control Gateway (SCG) failure, out of 5G coverage, and the like.

4) In accordance with the present disclosure, if the network always prioritises the UE to stay on the SA network and all the SA cells are disabled in that region then the UE may have to perform a full band scan to acquire service which may be time consuming (prolong no service around a minute). Further, the battery may also deplete to scan all faster frequencies before the UE can camp. In this scenario if the network redirects the UE to the SA network from the LTE network, and all the SA cells in that region are disabled, then UE may have to perform the full band scan. In worse situation, this back and forth of the RAT and no service issue can happen in every interval. Thus, the present disclosure suggests the UE to block the N1 mode temporarily if all SA cells in the current registration area are disabled by the UE.

According to embodiments of the present disclosure, a method implemented in a user equipment (UE) for connection management is provided. The method comprises establishing, by the UE, a connection with a 5G cell, wherein the established connection with the 5G cell is in a current tracking area of a 5G New Radio (NR). The method comprises determining, by the UE, one or more Long-Term Evolution (LTE) cells in one of the current tracking area and a registration area that are not accessible to the UE, wherein the one or more LTE cells are configured to operate on an LTE frequency. The method comprises temporarily deprioritising or disabling, by the UE, a Stand Alone (SA) mode based on the determination of the one or more LTE cells in the current tracking area that are not accessible to the UE.

In an embodiment, the SA mode is temporarily deprioritised or disabled to reduce a call drop until an occurrence of one or more of a change in the established connection from the current tracking area to a new tracking area, a completion of a specified amount of time after one of disabling or deprioritizing the SA mode, and a removal of the one or more LTE cells from an unallowed cell database.

In an embodiment, the method comprises detecting, by the UE after establishing the connection with the 5G cell, that the UE is redirected by the 5G NR from the 5G cell to the one or more LTE cells associated with the LTE frequency in the current tracking area.

In an embodiment, the method comprises transmitting, by the UE based on the established connection, an invitation request to the 5G NR indicating an initiation of one of an incoming call or an outgoing call.

In an embodiment, the method comprises detecting that the UE is redirected by the NR from the 5G cell to the one or more LTE cells comprises associating, by the UE, the 5G cell with the LTE frequency of the one or more LTE cells in an acquisition database upon the redirection of the UE from the 5G cell to the one or more LTE cells.

In an embodiment, determining the one or more LTE cells in one of the current tracking area and the registration area that are not accessible to the UE comprises disabling, by the UE, the 5G cell associated with the LTE frequency where the one or more LTE cells are not accessible, wherein the 5G cell is added to an unallowed cell database by the UE. Determining the one or more LTE cells in one of the current tracking area and the registration area that are not accessible to the UE comprises identifying, by the UE, an LTE cell associated with a new tracking area. The identified LTE cell is configured to operate on a new LTE frequency, and the unallowed cell database excludes a listing of the new LTE frequency and the identified LTE cell. Determining the one or more LTE cells in one of the current tracking area and the registration area that are not accessible to the UE comprises removing, by the UE based on a specified criterion, the 5G cell from the unallowed cell database in response to determining that the one or more LTE cells are removed from the unallowed cell database.

In an embodiment, determining that the one or more LTE cells in the current tracking area are not accessible comprises temporarily disabling, by the UE, an S1 mode for reducing a call drop until an occurrence of one or more of a change in the established connection from the current tracking area to a new tracking area, a completion of a specified amount of time after disabling the S1 mode, and a removal of the one or more LTE cells from an unallowed cell database. Determining that the one or more LTE cells in the current tracking area are not accessible comprises transmitting, by the UE, a registration request to the 5G NR, wherein the registration request includes a message indicating that the S1 mode is not supported by the UE.

In an embodiment, temporarily disabling the S1 mode comprises dialing, by the UE, a call over the 5G NR without user intervention. Temporarily disabling the S1 mode comprises determining, by the UE based on the dialed call, whether the UE is supported by Voice over New Radio (VoNR) in the 5G NR in response to temporarily disabling the S1 mode. Temporarily disabling the S1 mode comprises searching, by the UE, a new radio access technology (RAT)/ Public Land Mobile Network (PLMN) for initiating one of an incoming call or an outgoing call based on determining that the UE is unsupported by the VoNR.

In an embodiment, when the UE is supported by the VoNR and an S1 mode is temporarily disabled, the method comprises detecting, by the UE, a failure in the initiation of one of the incoming call or the outgoing call in the 5G NR. When the UE is supported by the VoNR and an S1 mode is temporarily disabled, the method comprises permanently disabling, by the UE, the SA mode in the 5G NR based on the detected failure. When the UE is supported by the VoNR and an S1 mode is temporarily disabled, the method comprises switching, by the UE, to a 3G network from the 5G NR supporting the SA mode for initiating one of the incoming call or the outgoing call.

In an embodiment, detecting the failure in the initiation of one of the incoming call or the outgoing call in the 5G NR comprises switching, by the UE, to an Evolved Packet Data Gateway (EPDG) network from the 5G NR, wherein the switching to the EPDG network is performed over Wireless-Fidelity (Wi-Fi) by registering the UE in the EPDG over Wi-Fi for initiating one of the incoming or the outgoing call.

In an embodiment, the method comprises performing, by the UE, an EPDG registration over a cellular network based on a UE registration with the EPDG network being unsuccessful over the Wi-Fi.

According to embodiments of the present disclosure, a method implemented in a user equipment (UE) configured to reduce service loss in a stand alone (SA) mode of the UE. The method comprises establishing, by a UE, a connection with a 4G cell, wherein the established connection with the 4G cell is in a current tracking area of a 4G Long-Term Evolution (LTE). The method comprises determining, by the UE, one or more SA cells in one of the current tracking area and registration area that are not accessible to the UE, wherein the one or more SA cells are configured to operate on a New Radio (NR) frequency. The method comprises temporarily deprioritising or disabling, by the UE, the SA mode supporting the one or more SA cells based on the determination of one or more SA cells in one of the current tracking area and the registration area that are not accessible to the UE.

In an embodiment, the SA mode is temporarily disabled or deprioritized to reduce the call drop until an occurrence of one or more of a change in the established connection from the current tracking area to a new tracking area, a completion of a specified amount of time after disabling the SA mode, and a removal of the one or more SA cells from an unallowed cell database.

In an embodiment, the method comprises detecting, by the UE after establishing the connection with the 4G cell, that the UE is redirected by the 4G LTE from the 4G cell to the one or more SA cells associated with the NR frequency in the current tracking area.

In an embodiment, the method comprises notifying, by the 5G NR, to the 4G LTE that the 5G cell and the one or more SA cells are disabled and added to an unallowed cell database.

In an embodiment, the method comprises notifying, by the 4G LTE, to the 5G NR that the 4G cell and the one or more LTE cells are disabled and added to an unallowed cell database.

In an embodiment, temporarily deprioritising or disabling the SA mode comprises setting, by the UE, a radio access technology (RAT) selection priority to Universal Mobile Telecommunications System (UMTS) and Global System for Mobile communication (GSM).

Temporarily deprioritising or disabling the SA mode comprises deprioritizing, by the UE, the SA mode to be lowest in a RAT selection table, wherein the SA mode corresponds to an NR RAT.

In an embodiment, the method comprises receiving, by the UE, one of a new Information Element (IE) and an existing IE from a 5G SA network to indicate Voice over New Radio (VoNR) feature support at a Radio Access Network (RAN) level, wherein the IE is associated with one of a dedicated message and a broadcasted message in one of Radio Resource Control (RRC) and a MAC layer. The method comprises determining, by the UE, whether the VoNR feature is supported at the RAN level based on the received one of the new IE and the existing IE. A presence of one of the new IE or the existing IE indicates one of a RAN level support for the VoNR feature or Evolved Packet System Fallback (EPS PB) support. An absence of one of the new IE or the existing IE indicates one of the EPS FB supports at the RAN Level or VoNR support at the RAN Level. The method comprises enabling, by the UE, N1 mode based on determining that the VoNR feature is supported at the RAN level.

According to embodiments of the present disclosure, a user equipment (UE) configured to provide connection management. The UE includes one or more processors configured to establish a connection with a 5G cell, wherein the established connection with the cell is in a current tracking area of a 5G New Radio (NR). The one or more processors are configured to determine one or more Long-Term Evolution (LTE) cells in one of the current tracking area and registration area that are not accessible to the UE, wherein the one or more LTE cells are configured to operate on an LTE frequency. The one or more processors are configured to temporarily disable or deprioritize a Stand Alone (SA) mode based on the determination of the one or more LTE cells in one of the current tracking area and the registration area that are not accessible to the UE.

In an embodiment, the SA mode is temporarily disabled or deprioritized to reduce a call drop until an occurrence of one or more of a change in the established connection from the current tracking area to a new tracking area, a completion of a specified amount of time after disabling the SA mode, and a removal of the one or more LTE cells from an unallowed cell database.

In an embodiment, the one or more processors are configured to detect, after establishing the connection with the 5G cell, that the UE is redirected by the 5G NR from the cell to the one or more LTE cells associated with the LTE frequency in the current tracking area.

In an embodiment, the one or more processors are configured to transmit, based on the established connection, an invitation request to the 5G NR that indicates an initiation of one of an incoming call or an outgoing call.

In an embodiment, in detecting that the UE is redirected by the 5G NR from the cell to the one or more LTE cells, the one or more processors are configured to associate the 5G cell with the LTE frequency of the one or more LTE cells in an acquisition database upon the redirection of the UE from the 5G cell to the one or more LTE cells.

In an embodiment, in determining the one or more LTE cells in one of the current tracking area and the registration area that are not accessible to the UE, the one or more processors are configured to disable the 5G cell associated with the LTE frequency where the one or more LTE cells are not accessible, wherein the 5G cell is added to an unallowed cell database by the UE. The one or more processors are configured to identify an LTE cell associated with a new tracking area. The identified LTE cell is configured to operate on a new LTE frequency. The unallowed cell database excludes a listing of the new LTE frequency and the identified LTE cell. The one or more processors are configured to remove, based on a specified criterion, the 5G cell from the unallowed cell database in response to determining that the one or more LTE cells are removed from the unallowed cell database.

In an embodiment, in determining that the one or more LTE cells in the current tracking area are not accessible, the one or more processors are configured to temporarily disable an S1 mode for reducing a call drop until an occurrence of one or more of a change in the established connection from the current tracking area to a new tracking area, a completion of a specified amount of time after disabling the S1 mode, and a removal of the one or more LTE cells from an unallowed cell database. The one or more processors are configured to transmit a registration request to the 5G NR, wherein the registration request includes a message indicating that the S1 mode is not supported by the UE.

In an embodiment, in temporarily disabling the S1 mode, the one or more processors are configured to dial a call over the 5G NR without user intervention. The one or more processors are configured to determine, based on the dialed call, whether the UE is supported by Voice over New Radio (VoNR) in the 5G NR in response to temporarily disabling the S1 mode. The one or more processors are configured to search a new radio access technology (RAT)/Public Land Mobile Network (PLMN) for initiating one of an incoming call or an outgoing call when it is determined that the UE is unsupported by the VoNR.

In an embodiment, based on the UE being supported by the VoNR and an S1 mode is temporarily disabled, the one or more processors are configured to detect a failure in the initiation of one of the incoming call or the outgoing call in the 5G NR. The one or more processors are configured to permanently disable the SA mode in the 5G NR based on the detected failure. The one or more processors are configured to switch to a 3G network from the NR supporting the SA mode for initiating one of the incoming call or the outgoing call.

In an embodiment, in detecting the failure in the initiation of one of the incoming call or the outgoing call in the 5G NR, one or more processors are configured to switch to an Evolved Packet Data Gateway (EPDG) network from the 5G NR, wherein the switching to the EPDG network is performed over Wireless-Fidelity (Wi-Fi) by registering the UE in the EPDG over Wi-Fi for initiating one of the incoming or the outgoing call.

In an embodiment, the one or more processors are configured to perform an EPDG registration over a cellular network based on a UE registration with the EPDG network being unsuccessful over the Wi-Fi.

According to embodiments of the present disclosure, a user equipment (UE) configured to reduce service loss in a stand alone (SA) mode of the UE. The UE includes one or more processors configured to establish a connection with a 4G cell, wherein the established connection with the 4G cell is in a current tracking area of a 4G Long-Term Evolution (LTE). The one or more processors are configured to determine one or more SA cells in one of the current tracking area and registration area that are not accessible to the UE, wherein the one or more SA cells are configured to operate on a New Radio (NR) frequency. The one or more processors are configured to temporarily disable or deprioritize the SA mode supporting the one or more SA cells based on the determination of one or more SA cells in one of the current tracking area and the registration area that are not accessible to the UE.

In an embodiment, the SA mode is temporarily disabled or deprioritized to reduce the call drop until an occurrence of one or more of a change in the established connection from the current tracking area to a new tracking area, a completion of a specified amount of time after disabling the SA mode, and a removal of the one or more SA cells from an unallowed cell database.

In an embodiment, the one or more processors are configured to detect, after establishing the connection with the 4G cell, that the UE is redirected by the 4G LTE from the 4G cell to the one or more SA cells associated with the NR frequency in the current tracking area.

In an embodiment, the 5G NR is configured to notify the 4G LTE that the 5G cell and the one or more SA cells are disabled and added to an unallowed cell database.

In an embodiment, the 4G LTE is configured to notify the 5G NR that the 4G cell and the one or more LTE cells are disabled and added to an unallowed cell database.

In an embodiment, in temporarily deprioritising or disabling the SA mode, the one or more processors are configured to set a radio access technology (RAT) selection priority to Universal Mobile Telecommunications System (UMTS) and Global System for Mobile communication (GSM). The one or more processors are configured to deprioritize the SA mode to be lowest in a RAT selection table, wherein the SA mode corresponds to an NR RAT.

In an embodiment, the one or more processors are configured to receive one of a new Information Element (IE) and an existing IE from a 5G SA network to indicate Voice over New Radio (VoNR) feature support at a Radio Access Network (RAN) level, wherein the IE is associated with one of a dedicated message and a broadcasted message in one of Radio Resource Control (RRC) and a MAC layer. The one or more processors are configured to determine if the VoNR feature is supported at the RAN level based on the received one of the new IE and the existing IE. A presence of one of the new IE or the existing IE indicates one of a RAN level support for the VoNR feature or Evolved Packet System Fallback (EPS FB) support. An absence of one of the new IE or the existing IE indicates one of the EPS FB supports at the RAN Level or VoNR support at the RAN Level. The one or more processors are configured to enable N1 mode based on determining that the VoNR feature is supported at the RAN level.

According to embodiments of the disclosure, a method performed by a user equipment (UE) for connection management is provided. The method comprises establishing, by the UE, a connection with a new radio (NR) cell, wherein the established connection with the NR cell is in a current tracking area. The method comprises determining, by the UE, one or more long-term evolution (LTE) cells in one of the current tracking area and a registration area that are not accessible to the UE, wherein the one or more LTE cells are configured to operate on an LTE frequency. The method comprises temporarily deprioritising or disabling, by the UE, a stand alone (SA) mode based on the determination of the one or more LTE cells in the current tracking area that are not accessible to the UE.

In an embodiment, the SA mode is temporarily deprioritised or disabled to reduce a call drop until an occurrence of one or more of a change in the established connection from the current tracking area to a new tracking area, a completion of a specified amount of time after one of disabling or deprioritizing the SA mode, and a removal of the one or more LTE cells from an unallowed cell database.

In an embodiment, the method comprises detecting, by the UE after establishing the connection with the NR cell, that the UE is redirected from the NR cell to the one or more LTE cells associated with the LTE frequency in the current tracking area.

In an embodiment, the method comprises transmitting, by the UE based on the established connection, an invitation request to a NR core network entity that indicates an initiation of one of an incoming call or an outgoing call.

In an embodiment, the detecting that the UE is redirected from the NR cell to the one or more LTE cells comprises associating, by the UE, the NR cell with the LTE frequency of the one or more LTE cells in an acquisition database upon the redirection of the UE from the NR cell to the one or more LTE cells.

In an embodiment, the determining of the one or more LTE cells in one of the current tracking area and the registration area that are not accessible to the UE comprises disabling, by the UE, the NR cell associated with the LTE frequency where the one or more LTE cells are not accessible, wherein the NR cell is added to an unallowed cell database by the UE and identifying, by the UE, an LTE cell associated with a new tracking area. The identified LTE cell is configured to operate on a new LTE frequency. The unallowed cell database excludes a listing of the new LTE frequency and the identified LTE cell. The determining of the one or more LTE cells in one of the current tracking area and the registration area that are not accessible to the UE comprises removing, by the UE based on a specified criterion, the NR cell from the unallowed cell database in response to determining that the one or more LTE cells are removed from the unallowed cell database.

In an embodiment, the determining that the one or more LTE cells in the current tracking area are not accessible comprises temporarily disabling, by the UE, an S1 mode for reducing a call drop until an occurrence of one or more of a change in the established connection from the current tracking area to a new tracking area, a completion of a specified amount of time after disabling the S1 mode, and a removal of the one or more LTE cells from an unallowed cell database. The determining that the one or more LTE cells in the current tracking area are not accessible comprises transmitting, by the UE, a registration request to a NR core network entity, wherein the registration request includes a message indicating that the S1 mode is not supported by the UE.

In an embodiment, the temporarily disabling the S1 mode comprises dialing, by the UE, a call, determining, by the UE based on the dialed call, whether the UE is supported by voice over new radio (VoNR) in a 5th generation (5G) network in response to temporarily disabling the S1 mode. The temporarily disabling the S1 mode comprises searching, by the UE, a new radio access technology (RAT)/public land mobile network (PLMN) for initiating one of an incoming call or an outgoing call based on determining that the UE is unsupported by the VoNR.

In an embodiment, when the UE is supported by the VoNR and an S1 mode is temporarily disabled, the method comprises detecting, by the UE, a failure in the initiation of one of the incoming call or the outgoing call in the 5G network. the method comprises disabling, by the UE, the SA mode in the 5G network based on the detected failure. The method comprises switching, by the UE, to a 3rd generation (3G) network from the 5G network supporting the SA mode for initiating one of the incoming call or the outgoing call.

In an embodiment, detecting the failure in the initiation of one of the incoming call or the outgoing call in the 5G network comprises switching, by the UE, to an evolved packet data gateway (EPDG) network from the 5G network, wherein the switching to the EPDG network is performed over wireless-fidelity (Wi-Fi) by registering the UE in the EPDG over Wi-Fi for initiating one of the incoming or the outgoing call.

In an embodiment, the method comprises performing, by the UE, an EPDG registration over a cellular network based on a UE registration with the EPDG network being unsuccessful over the Wi-Fi.

In an embodiment, the temporarily deprioritising or disabling of the SA mode comprises setting, by the UE, a radio access technology (RAT) selection priority to universal mobile telecommunications system (UMTS) and global system for mobile communication (GSM); and deprioritizing, by the UE, the SA mode to be lowest in a RAT selection table, wherein the SA mode corresponds to an NR RAT.

In an embodiment, the method comprises receiving, by the UE, one of a new information element (IE) and an existing IE from a 5G SA network to indicate voice over new radio (VoNR) feature support at a radio access network (RAN) level, wherein the IE is associated with one of a dedicated message and a broadcasted message in one of radio resource control (RRC) and a medium access control (MAC) layer. The method comprises determining, by the UE, whether the VoNR feature is supported at the RAN level based on the received one of the new IE and the existing IE. A presence of one of the new IE or the existing IE indicates one of a RAN level support for the VoNR feature or evolved packet system fallback (EPS FB) support. An absence of one of the new IE or the existing IE indicates one of the EPS FB supports at the RAN Level or VoNR support at the RAN Level. The method comprises enabling, by the UE, N1 mode based on determining that the VoNR feature is supported at the RAN level.

According to embodiments of the disclosure, a user equipment (UE) configured to provide connection management, the UE includes one or more processors configured to establish a connection with a new radio (NR) cell, wherein the established connection with the NR cell is in a current tracking area of a NR. The one or more processors are configured to determine one or more long-term evolution (LTE) cells in one of the current tracking area and registration area that are not accessible to the UE, wherein the one or more LTE cells are configured to operate on an LTE frequency. The one or more processors are configured to, temporarily disable or deprioritize a stand alone (SA) mode based on the determination of the one or more LTE cells in one of the current tracking area and the registration area that are not accessible to the UE.

In an embodiment, the SA mode is temporarily disabled or deprioritized to reduce a call drop until an occurrence of one or more of a change in the established connection from the current tracking area to a new tracking area, a completion of a specified amount of time after disabling the SA mode, and a removal of the one or more LTE cells from an unallowed cell database.

In an embodiment, the one or more processors are configured to detect, after establishing the connection with the NR cell, that the UE is redirected by the NR from the NR cell to the one or more LTE cells associated with the LTE frequency in the current tracking area.

In an embodiment, the one or more processors are configured to transmit, based on the established connection, an invitation request to the NR that indicates an initiation of one of an incoming call or an outgoing call.

In an embodiment, in detecting that the UE is redirected by the NR from the NR cell to the one or more LTE cells, the one or more processors are configured to associate the NR cell with the LTE frequency of the one or more LTE cells in an acquisition database upon the redirection of the UE from the NR cell to the one or more LTE cells.

In an embodiment, in determining the one or more LTE cells in one of the current tracking area and the registration area that are not accessible to the UE, the one or more processors are configured to disable the NR cell associated with the LTE frequency where the one or more LTE cells are not accessible, wherein the NR cell is added to an unallowed cell database by the UE. In determining the one or more LTE cells in one of the current tracking area and the registration area that are not accessible to the UE, the one or more processors are configured to identify an LTE cell associated with a new tracking area. The identified LTE cell is configured to operate on a new LTE frequency. The unallowed cell database excludes a listing of the new LTE frequency and the identified LTE cell. in determining the one or more LTE cells in one of the current tracking area and the registration area that are not accessible to the UE, the one or more processors are configured to remove, based on a specified criterion, the NR cell from the unallowed cell database in response to determining that the one or more LTE cells are removed from the unallowed cell database.

In an embodiment, in determining that the one or more LTE cells in the current tracking area are not accessible, the one or more processors are configured to, temporarily disable an S1 mode for reducing a call drop until an occurrence of one or more of a change in the established connection from the current tracking area to a new tracking area, a completion of a specified amount of time after disabling the S1 mode, and a removal of the one or more LTE cells from an unallowed cell database. In determining that the one or more LTE cells in the current tracking area are not accessible, the one or more processors are configured to transmit a registration request to a NR core network entity, wherein the registration request includes a message indicating that the S1 mode is not supported by the UE.

In an embodiment, in temporarily disabling the S1 mode, the one or more processors are configured to dial a call over the NR. In temporarily disabling the S1 mode, the one or more processors are configured to determine, based on the dialed call, whether the UE is supported by voice over new radio (VoNR) in a 5th generation (5G) network in response to temporarily disabling the S1 mode.

In temporarily disabling the S1 mode, the one or more processors are configured to search a new radio access technology (RAT)/public land mobile network (PLMN) for initiating one of an incoming call or an outgoing call based on determining that the UE is unsupported by the VoNR.

In an embodiment, based on the UE being supported by the VoNR and an S1 mode is temporarily disabled, the one or more processors are configured to detect a failure in the initiation of one of the incoming call or the outgoing call in the 5G network. Based on the UE being supported by the VoNR and an S1 mode is temporarily disabled, the one or more processors are configured to permanently disable the SA mode in the 5G network based on the detected failure. Based on the UE being supported by the VoNR and an S1 mode is temporarily disabled, the one or more processors are configured to switch to a 3G network from the 5G network supporting the SA mode for initiating one of the incoming call or the outgoing call.

In an embodiment, in detecting the failure in the initiation of one of the incoming call or the outgoing call in the 5G network, one or more processors are configured to switch to an evolved packet data gateway (EPDG) network from the 5G network, wherein the switching to the EPDG network is performed over wireless-fidelity (Wi-Fi) by registering the UE in the EPDG over Wi-Fi for initiating one of the incoming or the outgoing call.

In an embodiment, the one or more processors are configured to perform an EPDG registration over a cellular network based on a UE registration with the EPDG network being unsuccessful over the Wi-Fi.

In an embodiment, in temporarily deprioritising or disabling the SA mode, the one or more processors are configured to set a radio access technology (RAT) selection priority to universal mobile telecommunications system (UMTS) and global system for mobile communication (GSM). In temporarily deprioritising or disabling the SA mode, the one or more processors are configured to deprioritize the SA mode to be lowest in a RAT selection table, wherein the SA mode corresponds to an NR RAT.

In an embodiment, the one or more processors are configured to receive one of a new information element (IE) and an existing IE from a 5G SA network to indicate voice over new radio (VoNR) feature support at a radio access network (RAN) level, wherein the IE is associated with one of a dedicated message and a broadcasted message in one of radio resource control (RRC) and a medium access control (MAC) layer. The one or more processors are configured determine if the VoNR feature is supported at the RAN level based on the received one of the new IE and the existing IE. A presence of one of the new IE or the existing IE indicates one of a RAN level support for the VoNR feature or evolved packet system fallback (EPS FB) support. An absence of one of the new IE or the existing IE indicates one of the EPS FB supports at the RAN Level or VoNR support at the RAN Level. The one or more processors are configured enable N1 mode based on determining that the VoNR feature is supported at the RAN level.

While specific language has been used to describe the disclosure, any limitations arising on account of the same are not intended. As would be apparent to one skilled in the art, various working modifications may be made to the method in order to implement the disclosure as taught herein.

The drawings and the forgoing description give examples of embodiments. Those skilled in the art will appreciate that one or more of the described elements may well be combined into a single functional element. Certain elements may be split into multiple functional elements. Elements from one embodiment may be added to another embodiment. For example, orders of processes described herein may be changed and are not limited to the manner described herein. Moreover, the actions of any flowchart need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the disclosure or not, such as differences in structure, dimension, and use of material, are possible. The scope of the various embodiments is at least as broad as given by the following claims.

Benefits, other advantages, and solutions to problems have been described above with regard to various example embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method performed by a user equipment (UE) for connection management, the method comprising:
    establishing a connection with a new radio (NR) cell supporting an evolved packet system (EPS) fall back (FB), wherein the established connection with the NR cell is in a current tracking area;
    after establishing the connection with the NR cell, detecting that the UE is redirected from the NR cell to a long-term evolution (LTE) cell having a first LTE frequency in the current tracking area;
    in response to determining that all LTE cells having the first LTE frequency in at least one of the current tracking area and a registration area are in an unallowed cell database of the UE, adding the NR cell to the unallowed cell database of the UE; and
    performing a reselection of a new LTE cell having a second LTE frequency different from the first LTE frequency.

2. The method of claim 1, wherein the NR cell is stored in the unallowed cell database of the UE to reduce a call drop until an occurrence of one or more of:
    a change in the established connection from the current tracking area to a new tracking area,
    a completion of a specified amount of time after at least one of disabling or deprioritizing the NR cell, and
    a removal of one or more LTE cells having the first LTE frequency from the unallowed cell database.

3. The method of claim 1, further comprising:
    associating, by the UE, the NR cell with the first LTE frequency of the LTE cell in an acquisition database upon the redirection of the UE from the NR cell to the LTE cell.

4. The method of claim 1, further comprising:
    removing, by the UE based on a specified criterion, the NR cell from the unallowed cell database in response to determining that one or more LTE cells having the first LTE frequency are removed from the unallowed cell database.

5. The method of claim 1, further comprising:
    temporarily disabling, by the UE, an S1 mode for reducing a call drop until an occurrence of one or more of:
    a change in the established connection from the current tracking area to a new tracking area,
    a completion of a specified amount of time after disabling the S1 mode, and
    a removal of one or more LTE cells from the unallowed cell database; and
    transmitting, by the UE, a registration request to a NR core network entity, wherein the registration request includes a message indicating that the S1 mode is not supported by the UE.

6. The method of claim 5, wherein temporarily disabling the S1 mode comprises:
    dialing, by the UE, a call;
    determining, by the UE based on the dialed call, whether the UE is supported by voice over new radio (VoNR) in a 5$^{th}$ generation (5G) network in response to temporarily disabling the S1 mode; and
    searching, by the UE, a new radio access technology (RAT)/public land mobile network (PLMN) for initiating at least one of an incoming call or an outgoing call based on determining that the UE is unsupported by the VoNR.

7. The method of claim 1, comprising:

receiving, by the UE, at least one of a new information element (IE) and an existing IE from a 5G SA network to indicate voice over new radio (VoNR) feature support at a radio access network (RAN) level, wherein the IE is associated with at least one of a dedicated message and a broadcasted message in at least one of radio resource control (RRC) and a medium access control (MAC) layer;

determining, by the UE, whether the VoNR feature is supported at the RAN level based on the received at least one of the new IE and the existing IE, wherein a presence of at least one of the new IE or the existing IE indicates at least one of a RAN level support for the VoNR feature or EPS FB support, and an absence of the at least one of the new IE or the existing IE indicates at least one of the EPS FB supports at the RAN Level for VoNR support at the RAN Level, and enabling, by the UE, N1 mode based on determining that the VoNR feature is supported at the RAN level.

8. A user equipment (UE) comprising:

one or more processors including processing circuitry;

a communication interface including communication circuitry, coupled to the one or more processors; and memory coupled to the one or more processors, wherein the one or more processors are configured, individually and/or collectively, to:

establish a connection with a new radio (NR) cell supporting an evolved packet system (EPS) fall back (FB), wherein the established connection with the NR cell is in a current tracking area of a NR;

after establishing the connection with the NR cell, detect that the UE is redirected from the NR cell to a long-term evolution (LTE) cell having a first LTE frequency in the current tracking area;

in response to determining that all LTE cells associated with the first LTE frequency in at least one of the current tracking area and registration area are in an unallowed cell database of the UE, adding the NR cell to the unallowed cell database of the UE; and perform a reselection of a new LTE cell having a second LTE frequency different from the first LTE frequency.

9. The UE of claim 8, wherein the NR cell is stored in the unallowed cell database of the UE to reduce a call drop until an occurrence of one or more of:

a change in the established connection from the current tracking area to a new tracking area, a completion of a specified amount of time after disabling the NR cell, and a removal of one or more LTE cells having the first LTE frequency from the unallowed cell database.

10. The UE of claim 8, wherein the one or more processors are configured, individually and/or collectively, to:

associate the NR cell with the first LTE frequency of the LTE cell in an acquisition database upon the redirection of the UE from the NR cell to the LTE cell.

11. The UE of claim 8, wherein the one or more processors are configured, individually and/or collectively, to:

remove, based on a specified criterion, the NR cell from the unallowed cell database in response to determining that one or more LTE cells having the first LTE frequency are removed from the unallowed cell database.

12. The UE of claim 8, wherein the one or more processors are configured, individually and/or collectively, to:

temporarily disable an S1 mode for reducing a call drop until an occurrence of one or more of:

a change in the established connection from the current tracking area to a new tracking area, a completion of a specified amount of time after disabling the S1 mode, and a removal of the one or more LTE cells from the unallowed cell database; and transmit a registration request to a NR core network entity, wherein the registration request includes a message indicating that the S1 mode is not supported by the UE.

13. The UE of claim 12, wherein, in temporarily disabling the S1 mode, the one or more processors are configured, individually and/or collectively, to:

dial a call over the NR;

determine, based on the dialed call, whether the UE is supported by voice over new radio (VoNR) in a $5^{th}$ generation (5G) network in response to temporarily disabling the S1 mode; and search a new radio access technology (RAT)/public land mobile network (PLMN) for initiating at least one of an incoming call or an outgoing call based on determining that the UE is unsupported by the VoNR.

14. The UE of claim 8, wherein the one or more processors are configured, individually and/or collectively, to:

receive at least one of a new information element (IE) and an existing IE from a 5G SA network to indicate voice over new radio (VoNR) feature support at a radio access network (RAN) level, wherein the IE is associated with at least one of a dedicated message and a broadcasted message in at least one of radio resource control (RRC) and a medium access control (MAC) layer;

determine if the VoNR feature is supported at the RAN level based on the received at least one of the new IE and the existing IE, wherein:

a presence of at least one of the new IE or the existing IE indicates at least one of a RAN level support for the VoNR feature or EPS FB support, and an absence of at least one of the new IE or the existing IE indicates at least the EPS FB supports at the RAN Level or VoNR support at the RAN Level, and enable N1 mode based on determining that the VoNR feature is supported at the RAN level.

* * * * *